United States Patent
Friesen et al.

(10) Patent No.: US 8,480,486 B2
(45) Date of Patent: Jul. 9, 2013

(54) METHOD AND APPARATUS FOR MANAGING HOTEL TRANSACTIONS FROM A GAMING DEVICE

(75) Inventors: Scott T. Friesen, Stamford, CT (US); Jay S. Walker, Ridgefield, CT (US); James A. Jorasch, Stamford, CT (US); Geoffrey M. Gelman, Stamford, CT (US); Daniel E. Tedesco, Huntington, CT (US); Michael D. Downs, Stamford, CT (US)

(73) Assignee: IGT, Reno, NV (US)

( * ) Notice: Subject to any disclaimer, the term of this patent is extended or adjusted under 35 U.S.C. 154(b) by 1087 days.

(21) Appl. No.: 12/237,123

(22) Filed: Sep. 24, 2008

(65) Prior Publication Data

US 2009/0011836 A1 Jan. 8, 2009

Related U.S. Application Data

(60) Division of application No. 11/427,929, filed on Jun. 30, 2006, now abandoned, which is a continuation of application No. 10/187,120, filed on Jun. 28, 2002, now abandoned.

(60) Provisional application No. 60/302,063, filed on Jun. 29, 2001.

(51) Int. Cl.
*A63F 9/24* (2006.01)

(52) U.S. Cl.
USPC ............... 463/29; 463/16; 463/20; 463/25; 463/42

(58) Field of Classification Search
USPC .................. 463/42, 16, 20, 25, 29
See application file for complete search history.

(56) References Cited

U.S. PATENT DOCUMENTS

| | | | |
|---|---|---|---|
| 4,209,782 A | 6/1980 | Donath et al. | |
| 4,415,893 A | 11/1983 | Roland et al. | |
| 4,752,876 A | 6/1988 | Couch et al. | |
| 4,994,908 A | 2/1991 | Kuban et al. | |
| 5,463,546 A | 10/1995 | Parkhurst | |
| 5,614,703 A | 3/1997 | Martin et al. | |
| 5,732,398 A | 3/1998 | Tagawa | |
| 5,939,694 A | 8/1999 | Holcomb et al. | |
| 5,971,271 A * | 10/1999 | Wynn et al. | 235/380 |
| 6,007,426 A | 12/1999 | Kelly et al. | |
| 6,094,640 A | 7/2000 | Goheen | |
| 6,101,477 A | 8/2000 | Hohle et al. | |

(Continued)

FOREIGN PATENT DOCUMENTS

EP 0 896 304 A2 2/1999

OTHER PUBLICATIONS

Adams, Bruce, "Key issues: Manufacturers' security agendas include diversification," Hotel & Motel Management, Feb. 18, 2002, Section 3, vol. 217, p. 40, ISSN: 0018-6082.

(Continued)

*Primary Examiner* — Omkar Deodhar
(74) *Attorney, Agent, or Firm* — Neal, Gerber & Eisenberg LLP

(57) ABSTRACT

A customer may be permitted to use a gaming device such as a slot machine to manage various transactions related to a hotel, such as checking in and/or checking out of the customer's room at the hotel. A customer may receive a benefit in exchange for using a gaming device for a transaction.

15 Claims, 13 Drawing Sheets

U.S. PATENT DOCUMENTS

| | | | |
|---|---|---|---|
| 6,183,362 B1 | | 2/2001 | Boushy |
| 6,292,480 B1 | * | 9/2001 | May ............................. 370/352 |
| 6,505,772 B1 | | 1/2003 | Mollett et al. |
| 6,539,101 B1 | | 3/2003 | Black |
| 6,554,705 B1 | | 4/2003 | Cumbers |
| 6,826,534 B1 | * | 11/2004 | Gupta et al. ................. 705/7.12 |
| 6,942,574 B1 | | 9/2005 | Lemay et al. |
| 6,971,956 B2 | | 12/2005 | Rowe et al. |
| 7,022,017 B1 | * | 4/2006 | Halbritter et al. ............... 463/42 |
| 2001/0016825 A1 | | 8/2001 | Pugliese, III et al. |
| 2002/0142846 A1 | | 10/2002 | Paulsen |
| 2002/0193099 A1 | * | 12/2002 | Paulsen ........................ 455/414 |
| 2003/0050806 A1 | | 3/2003 | Friesen et al. |
| 2004/0137978 A1 | | 7/2004 | Cole et al. |
| 2006/0262624 A1 | | 11/2006 | Roohparvar |
| 2007/0004518 A1 | | 1/2007 | Friesen et al. |
| 2007/0037554 A1 | | 2/2007 | Freeny, Jr. |
| 2008/0033635 A1 | | 2/2008 | Obradovich et al. |

OTHER PUBLICATIONS

Advisory Action for U.S. Appl. No. 11/427,929, dated Jan. 28, 2008 (3 pages).

"Casino bosses avoiding the benefits, cost of computers," The Associated Press State and Local Wire, Jul. 20, 1999, BC Cycle, Section: Business News.

Conniff, Michael, "Don't Bet Against Harrah's When it Comes to ISDS," Electronic Services Update, May 1, 1989, vol. 2, No. 5 (3 pages).

Examiner's Answer for U.S. Appl. No. 10/187,120 dated Oct. 5, 2007 (34 pages).

Executive Travel in Asia This Week, Apr. 21, 1999, PR Newswire (4 pages).

Flyertalk.com, http://www.flyertalk.com/forum/showthread.php?t=72, Aug. 1998 (4 pages).

Griffith, Victoria, "Business Travel: The impersonal touch: Computers are gradually taking over services from real people in US hotels, says Victoria Griffith," Jul. 15, 1996, Financial Times, London Edition 1 ED, p. 12.

Ghrist, John, "21st Century Convenience in an Antebellum Atmosphere," Hospitality Upgrade, Copyright 2002 (4 pages).

"Harrah's bets on IT to understand its customers," Informationweek, Dec. 11, 2000, Section: p. RB10-RB12, ISSN: 8750-6874, CODEN: INFWE4.

Hurley, Hanna, "A network you can bet on: New York-New York Hotel & Casino's switch-based network," Netword, May 1997, Section: vol. 12, No. 5, p. 143, ISSN: 1093-8001.

Needham, Peter, "Speed the Road Warrior," Sydney Morning Herald, Sep. 12, 1998, Section: Travel, p. 6.

Notice of Panel Decision from Pre-Appeal Brief Review for U.S. Appl. No. 10/187,120 dated Jan. 19, 2007 (2 pages).

Office Action for U.S. Appl. No. 10/187,120 dated Aug. 1, 2006 (23 pages).

Office Action for U.S. Appl. No. 10/187,120 dated Feb. 14, 2006 (22 pages).

Office Action for U.S. Appl. No. 11/427,876 dated Jul. 27, 2007 (7 pages).

Office Action for U.S. Appl. No. 11/427,876 dated Nov. 28, 2007 (11 pages).

Office Action for U.S. Appl. No. 11/427,929 dated Mar. 9, 2007 (6 pages).

Office Action for U.S. Appl. No. 11/427,929 dated Oct. 18, 2007 (12 pages).

Parets, Robin Taylor, "Comp solutions," International Gaming and Wagering Business, Sep. 1997, Section: p. 73, ISSN: 8750-8222.

"Promus Testing check-in method (Promus Hotel begins testing self-service check-in alternative for guests via kiosks)," Apr. 22, 1996, Hotel & Management, v. 211, n. 7, p. 50.

Reply Brief Noted for U.S. Appl. No. 10/187,120 dated Dec. 21, 2007.

Troy, Timothy N., "High stakes technology: technology for guest retention management," Hotel & Motel Management, Sep. 19, 1994, Section: vol. 209, No. 16, p. 27, ISSN: 0018-6082.

Troy, Timothy N., "The future at your fingertips: hand-held systems figure to impact hotel operations when prices go down and technology advances," Hotel & Motel Management, May 9, 1994, Section: vol. 209, No. 8, p. 31, ISSN: 0018-6082.

* cited by examiner

| ROOM IDENTIFIER 712 | ROOM TYPE 714 | ROOM RATE 716 | SMOKING 718 | STATUS 720 | ACCESS CODE 722 |
|---|---|---|---|---|---|
| R123456 | SUITE | $250.00 | NO | OCCUPIED | 123456 |
| R321654 | STANDARD | $75.00 | NO | OCCUPIED | 654321 |
| R456789 | VILLA | $3,000.00 | YES | OCCUPIED | 789654 |
| R987654 | STANDARD | $75.00 | NO | UNOCCUPIED | 741258 |
| R963258 | LUXURY | $500.00 | YES | OCCUPIED | 987789 |

| OFFER IDENTIFIER 812 | OFFER DESCRIPTION 814 |
|---|---|
| OF123456 | FREE SHOE SHINE FOR ONE PAIR OF SHOES |
| OF321654 | $10.00 IN GAMING CREDITS |
| OF456789 | RECEIVE A COMPLIMENTARY COPY OF THE NEW YORK TIMES |
| OF987654 | RECEIVE 5 COMPLIMENTARY SOFT DRINKS IN ROOM REFRIGERATOR |
| OF963258 | $20.00 COUPON AT CASINO STEAKHOUSE |
| OF768314 | JACKPOTS PAY DOUBLE FOR THE NEXT 30 MINUTES |

FIG. 8

| PREFERENCES | | | | |
|---|---|---|---|---|
| FOOD | ENTERTAINMENT | LITERATURE | HOTEL ROOM | HOTEL CLEANING |
| PEANUTS | 1 PREMIUM CABLE CHANNEL | MAGAZINE | 5 EXTRA-LARGE TOWELS | DO NOT CLEAN ROOM BEFORE 10:00 AM |
| CANDY BAR | HIGH SPEED INTERNET ACCESS | NEWSPAPER | LAKE VIEW | DO NOT CLEAN ROOM |
| CEREAL | FAX MACHINE | TOURIST PAMPHLETS | 3 EXTRA SOAPS | CLEAN ROOM TWICE PER DAY |
| FRUIT | IN-HOUSE PAGER | BOOKS | BABY CRIB | LEAVE 1 EXTRA-LARGE GARBAGE CAN |

METHOD AND APPARATUS FOR MANAGING HOTEL TRANSACTIONS FROM A GAMING DEVICE

This application is a divisional of U.S. patent application Ser. No. 11/427,929, filed Jun. 30, 2006 which is a continuation of U.S. application Ser. No. 10/187,120 filed Jun. 30, 2002 which claims priority of U.S. Provisional Patent Application Ser. No. 60/302,063, filed Jun. 29, 2001, the content of which is hereby incorporated by reference in its entirety.

FIELD OF THE INVENTION

The present invention relates generally to the gaming and hospitality industries, and more specifically to hotel transaction functions.

BACKGROUND OF THE INVENTION

The hotel industry provides rooms to millions of travelers each year. Travelers may encounter delays in checking in and/or checking out of a hotel. When there are more customers desiring to check in or check out than employees available to assist them, a waiting line for check-in or check-out is likely. Check-in delays may be particularly frustrating for visitors to casino resort hotels, who are often anxious to begin their gaming experience.

One method that a resort casino has used to attempt to decrease long check-in lines has been to use a portable hand-held check-in device. Such a device, referred to as the EXPRESS CHECK-IN developed by INTER-AMERICAN DATA/LODGING MANAGEMENT SYSTEMS (IAD/LMS), enables hotel employees to check-in guests quickly and to give the guests room assignments based on swiping a credit card. The device uses hand-held wireless technology, and communicates in real-time over the known SPECTRUM24 wireless infrastructure to an AS/400-based property management system. Information concerning this device may be available at http://www.symbol.com/news/pressreleases/press_releases_wirelesslans_8.html.

One disadvantage of this device is that the system can only be operated by a hotel employee. As with conventional check-in procedures, the number of incoming or outgoing customers may exceed the number of employees equipped with the device. Thus, waiting lines are not likely to be eliminated in all cases.

It has also been proposed, in U.S. Pat. No. 6,101,477, that a hotel guest perform check-in without assistance from hotel employees by using a kiosk that is operated with smartcards carried by the hotel guests. Among the disadvantages of this proposal are the costs of providing and maintaining the kiosk.

BRIEF DESCRIPTION OF THE DRAWINGS

The present invention is described with reference to the accompanying drawings. In the drawings, like reference numbers indicate identical or functionally similar elements.

FIG. 7 is a tabular representation of an embodiment of a room database;

FIG. 8 is a tabular representation of an embodiment of an offer database;

FIG. 11 is a sample of a preferences page in accordance with one or more embodiments.

DETAILED DESCRIPTION OF THE INVENTION

Figure 1:
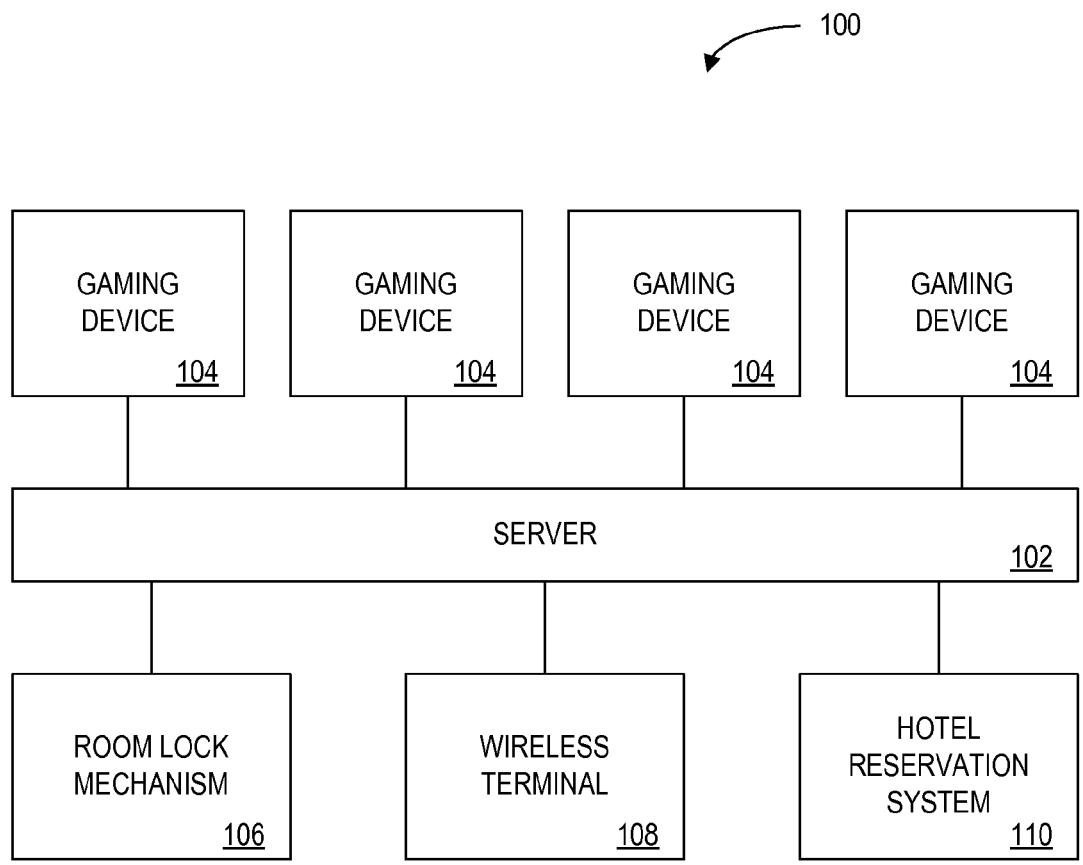
FIG. 1 is a schematic diagram in accordance with one or more embodiments of the invention.

According to various embodiments of the invention, a method for handling a hotel transaction, such as a check-in process or a check-out process, includes conducting the hotel transaction via a gaming device. According to other embodiments of the invention, a method is provided for communicating information with a person via a gaming device, such as reservation information, room information, guest preference information, message information, and/or offer information.

Various embodiments of the invention provide a method for handling a hotel transaction, including receiving a player identifier at a gaming device and assigning a hotel room to the player identified by the player identifier. Some embodiments provide a method including using the gaming device to communicate to the player information regarding the assigning of a hotel room (e.g., the number of the assigned hotel room may be displayed to the player by a slot machine).

In some embodiments of the invention, a method for handling a hotel transaction includes receiving a player identifier at a gaming device, and accessing a hotel reservation database on the basis of the received player identifier.

In one or more embodiments of the invention, a method for handling a hotel transaction includes receiving a player identifier at a gaming device and associating the received player identifier with a room identifier.

Some embodiments of the invention include presenting to a player identified by a player identifier at least one of a reservation confirmation page and a hotel room preferences page.

In some embodiments of the invention, a method for handling a hotel transaction includes receiving a player identifier at a gaming device, and receiving at the gaming device an indication that the player identified by the player identifier wishes to check out of a hotel room.

One or more embodiments of the invention provide for a method including offering and/or providing a benefit to a player in exchange for the player using a gaming device for all or a portion of a check-in process, and/or a check-out process.

Some embodiments of the invention provide for a method including offering and/or providing a benefit to a player in exchange for the player using a gaming device to obtain and/or provide information (e.g., hotel reservation information, restaurant reservation information, messages, or theater information) in lieu of receiving/providing the information from/to a hotel representative.

Systems, apparatus and computer program products are provided for carrying out the above-described embodiments and numerous other embodiments of the present invention. Each computer program product described herein may be carried by a medium readable by a computer (e.g., a carrier wave signal, a floppy disk, a hard drive, a random access memory, etc.).

Applicants have recognized that many different types of hotel guests, customers and players would find it appealing to use a gaming device for at least part of a check-in or check-out process. Applicants have also recognized that many different types of parties would find it appealing to permit guests and players to use a gaming device for at least part of a check-in or check-out process. With the methods and apparatus of the present invention, gaming devices such as slot machines and/or video poker machines may be used to supplement a casino hotel's facilities for checking in and/or checking out hotel guests. Consequently, waiting lines for checking in and/or checking out may be reduced or eliminated, thereby providing more free time for hotel guests to engage in gaming activities. As a result, gaming profits of the casino hotel may be increased.

Also, by allowing check-in and/or check-out via a gaming machine, hotel guests may be encouraged to engage in gaming activity at the gaming machine immediately upon arriving at the casino hotel, and/or prior to departing from the casino hotel. Again, the hotel guest's time spent in gaming activity may be increased, thereby increasing gaming profits of the casino hotel.

Applicants have also recognized that many different types of parties would find it appealing to use a gaming device for various types of hotel and information transactions. Gaming devices may be used to exchange communications with hotel guests, for example, concerning other aspects of their hotel stay in addition to check-in and/or check-out. Once more, the guests' time spent in gaming activity at the gaming devices may thereby be increased. Furthermore, promotional offers (e.g., from the hotel, from a third party) and other incentives may be communicated through and/or implemented by gaming devices, so that the satisfaction of guests, players, and other customers or potential customers with the casino hotel may be enhanced, and repeat business may be promoted.

Moreover, providing information exchange with the hotel guest via gaming devices, implementing functions related to the hotel reservation system via gaming devices, and presenting offers to customers via gaming devices all may lead customers to interact with gaming devices more frequently, to continue interacting with gaming devices for longer periods of time, or even to interact with gaming devices when they would not otherwise be inclined to do so. In some cases, guests who customarily do not engage in gaming activity may be encouraged, through interaction with a gaming device for non-gaming purposes, to engage in gaming activity also. The flexibility and convenience provided by devices offering access to various aspects of the casino experience, both gaming and non-gaming (e.g., hotel reservation information, restaurant reservation information, theater information, or a message center), may encourage guests and players to seek out such gaming devices and to patronize the hotels that offer them.

With these and other advantages and features of the invention that will become hereinafter apparent, the nature of the invention may be more clearly understood by reference to the following detailed description of the invention, to the appended claims and to the several drawings attached herein.

Novel methods, apparatus, systems and computer program products are provided that efficiently handle check-in and check-out transactions at a casino hotel. For example, in accordance with one or more embodiments of the invention, a player may arrive at a casino and observe a line at the hotel registration counter. The player may then approach one of a bank of slot machines located near the hotel registration counter. The slot machine is in data communication with a casino server. The player enters his player tracking card into the slot machine and is presented with a customized welcome message on the slot machine's video display. The slot machine may permit the player to indicate that the player desires to check in to the hotel. In response to such an indication, the casino server accesses a reservation database and locates the player's reservation. Alternatively, searching of the database for a reservation may occur automatically upon the player entering his player tracking card into the slot machine.

The slot machine presents a registration screen to the player on its video display. The slot machine may prompt the player to enter personal information and preferences. For example, the slot machine may prompt the player to confirm that the displayed hotel reservation information is correct and to choose from a list of personal preferences for perks related to the desired hotel room.

The slot machine may then prompt the player to enter his credit card into a credit card reader that is part of the slot machine. Alternatively, the casino server may automatically retrieve a previously stored credit card number from a database that is indexed by a player identifier code read by the slot machine from the player tracking card. The slot machine may then display a message to the player indicating that the player tracking card may be used as a hotel room key. In addition, the slot machine may display to the player the number of a room that has been assigned to the player.

The slot machine may include a printer that is used to print out for the player information such as a map of the hotel, directions to the player's room and/or a list of activities and shops within the casino hotel complex. The slot machine may also display a message to the player indicating that the player is being rewarded for using the slot machine to check in. The reward may be, for example, gaming credits that are usable for wagering at that slot machine.

At the end of the player's stay at the casino hotel, the player may also use a slot machine to handle a check-out transaction. To do so, the player enters his player tracking card into the slot machine and selects a check-out option. The casino server then accesses data relating to the player's room account (e.g., in a reservation or room database) and causes the slot machine to display to the player a statement of the player's account. The player can then approve the statement and receive a printed version of the statement from the printer of the slot machine. From the point of view of the player, check-out is now complete.

The present invention provides numerous advantages over the prior art. Through use of one or more embodiments of the invention, a player may be able to begin slot machine play almost immediately after arriving at the casino hotel, and without being delayed by lines at the registration counter. Accordingly, the total time available for the player to engage in gaming activity may be increased. The invention may provide increased convenience to the player in other ways, since the player may be able to check in or check out of the casino at any time of the day or night and without requiring assistance of hotel employees. The player may also be permitted, in one or more embodiments of the invention, to conveniently handle via a slot machine other hotel transactions in addition to check-in or check-out. In one or more embodiments, the player may also receive benefits and offers from the casino hotel based on one or more of the player's gaming activity and/or information or requests submitted by the player via the slot machine. For example, by filling out a customer preference survey, a player may request specific items to be delivered to his room. As another example, a player may automatically receive a room upgrade as a reward for playing the slot machine for a certain minimum period of time.

In addition to providing benefits to players, embodiments of the invention also provide benefits to the casino hotel. For example, since the player avoids wasting time on check-in and check-out, the time available to the player for gaming activities may increase, with a corresponding increase in casino revenue. Also, the interaction with the slot machine by the player for non-gaming activities may lead the player to visit the slot machine more frequently and to stay at the slot machine longer, resulting in more gaming activity by the player and enhanced gaming profits for the casino. Further, the casino may experience increased repeat visits from players due to the convenience and benefits offered by handling hotel transactions at a slot machine. In addition, information provided by the player, such as a customer and/or preference survey, may provide the casino hotel with a better understanding of customer needs and an ability to better serve customers. The casino hotel may also benefit from reduced overhead and/or labor costs, since guests are able to check in and/or check out of the hotel without the assistance of hotel employees.

The term "player" is frequently used herein to indicate a person interacting with a gaming device. It will be understood that "player" may refer to any person or entity (e.g., a hotel guest, a casino customer or potential customer, a tourist visiting a casino, or a slot machine player) using the gaming device in accordance with one or more embodiments of the present invention. Thus, a "player" need not play the gaming device (e.g., need not make a wager on a game of chance at the gaming device) and need not have been or plan to be a player of any gaming device. For example, a customer may use a gaming device only for non-gaming purposes, such as to make a future hotel reservation, to receive voice mail messages, or to schedule a room cleaning.

1. System

FIG. 1 is a schematic diagram of a system 100 in accordance with one or more embodiments of the invention. The system 100 includes a server 102 in communication with one or more gaming devices 104, room lock mechanisms 106, wireless terminals 108, and hotel reservation systems 110. Each of the gaming devices, room lock mechanisms, wireless terminals, and hotel reservation systems may comprise one or more computing devices, such as those based on the Intel® Pentium® processor, adapted to communicate with the server 102. Well-known computing devices include, without limitation, a personal computer; a portable type of computer, such as a laptop computer, a palm-top computer, a wearable computer, or a hand-held computer; and/or a Personal Digital Assistant (PDA). Other equivalent devices capable of performing the methods specified herein are well known in the art.

The gaming devices 104 may be, for example, slot machines and/or video poker machines. The server 102 and/or the gaming devices 104 may include features provided in accordance with one or more embodiments of the invention, as described further below. Although four gaming devices 104 are shown in the drawing, it should be understood that any number of gaming devices may communicate with the server 102.

The system 100 also includes a room lock mechanism 106 in communication with the server 102. The room lock mechanism 106 includes features provided in accordance with one or more embodiments of the invention, as described further below. Although only one room lock mechanism 106 is shown in FIG. 1, it should be understood that any number of room lock mechanisms may communicate with the server 102. In one or more embodiments of the invention, a respective room lock mechanism 106 provided in one or more embodiments and in communication with the server 102 is installed to control entry at each guest room of the hotel served by the server 102.

The system 100 also includes a wireless terminal 108 which is in communication (via a wireless data link) with the server 102. The wireless terminal 108 is provided in accordance with one or more embodiments of the invention, as described further below. Although only one wireless terminal 108 is shown in the drawing, it should be understood that any number of wireless terminals 108 may communicate with the server 102. While the wireless terminal 108 is a desirable feature of the system 100, it is not essential, and may be omitted from the system 100.

The system 100 also includes a reservation system 110 that is in communication with the server 102. The hotel reservation system 110 is provided in accordance with one or more embodiments of the invention, as described further below. The hotel reservation system 110 may operate in a conventional fashion, for example, to handle requests for reservations from prospective guests, to obtain room availability information from the server 102, and to provide reservation information to the server 102. In one or more embodiments of the invention, the server 102 may comprise the hotel reservation system 110.

The server 102 may communicate with the gaming devices, room lock mechanisms and the reservation system directly or via a network, including, without limitation, the Internet, wireless network protocol, local area network or a combination thereof; through a Web site maintained by the server 102 on a remote server; or over an on-line data network including, without limitation, commercial on-line service providers and bulletin board systems. The server 102 may communicate with the gaming devices, room lock mechanisms and the reservation system directly or indirectly. In yet other embodiments, communication with the server 102 may be via a radio frequency, infrared, cable TV, satellite links and the like.

Those skilled in the art will understand that devices in communication with each other need only be capable of communicating with each other and need not be continually transmitting data to or receiving data from each other. On the contrary, such devices need only transmit data to or receive data from each other as necessary, and may actually refrain from exchanging data most of the time. Further, devices may be in communication even though steps may be required to establish a communication link (e.g., dialing a network service provider).

The server 102 may function as a "Web server" that generates Web pages (documents on the Web that typically include an HTML file and associated graphics and script files) that may be accessed via the Web and allows communication with the server 102 in a manner known in the art.

2. Devices 2.1. Server

Figure 2:
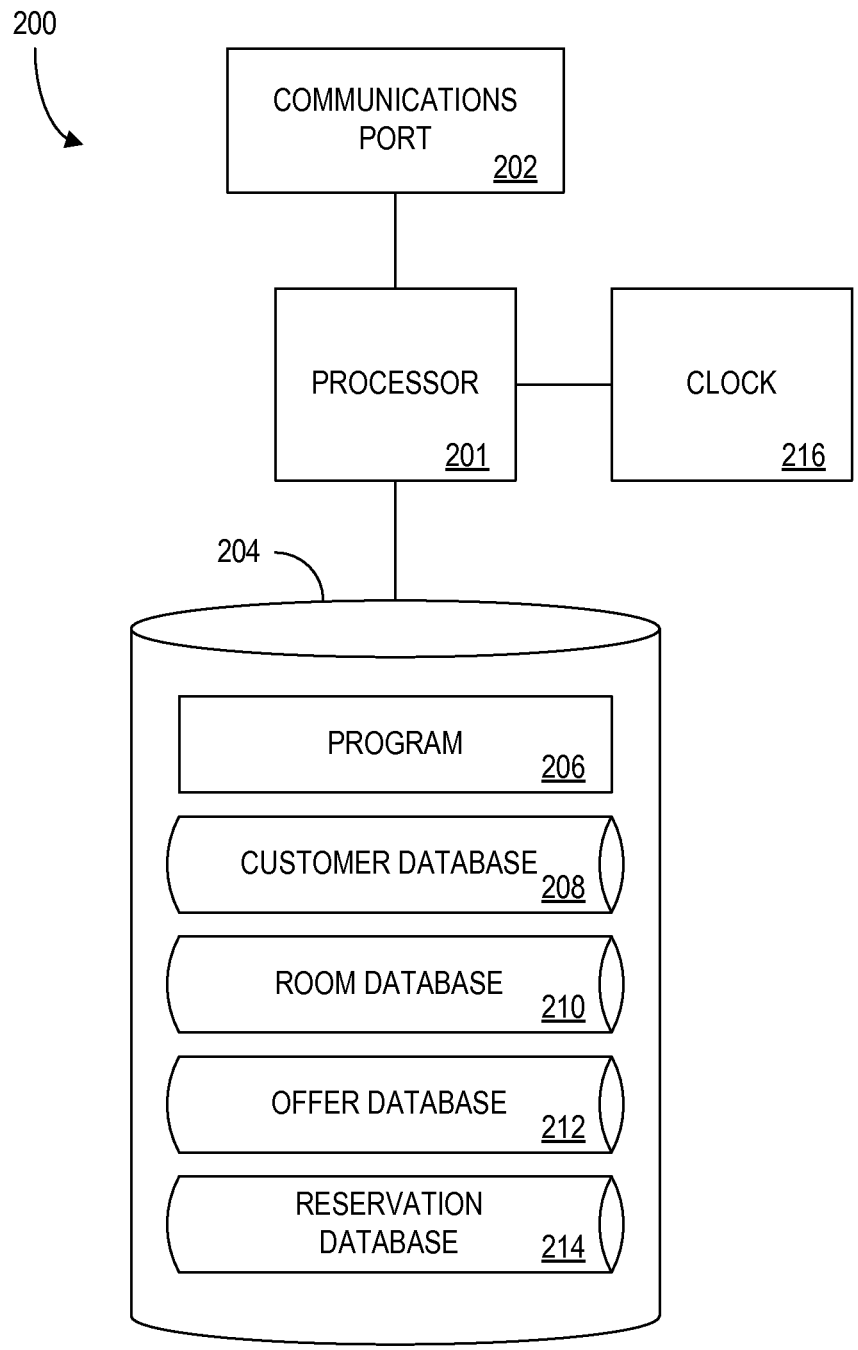
FIG. 2 is a schematic diagram of an exemplary embodiment of a server.

FIG. 2 illustrates an exemplary embodiment of the server 102 of FIG. 1. The casino server 200 may be implemented as a system controller, as a dedicated hardware circuit, as an appropriately programmed general purpose computer, or as any other equivalent electronic, mechanical or electro-mechanical device. The casino server 200 is preferably operable to process various hotel transactions and casino transactions.

With reference to FIG. 2, the casino server 200 comprises a processor 201, such as one or more conventional microprocessors (e.g., one or more INTEL® PENTIUM® processors). The processor 201 is in communication with a communications port 202 through which the processor 201 communicates with other devices (e.g., with gaming devices, with room lock mechanisms, with wireless terminals, and with a hotel reservation system). The communications port 202 may include multiple communication channels for simultaneous communication with, for example, the gaming devices 104, the room lock mechanism 106, other room lock mechanisms (not shown), the wireless terminal 108, other wireless terminals (not shown) and/or the hotel reservation system 110. As previously stated, devices in communication with each other need not be continually transmitting to each other. On the contrary, such devices need only transmit to each other as necessary, may actually refrain from exchanging data most of the time, and may require several steps to be performed to establish a communication link between the devices.

The processor 201 also is in communication with a data storage device 204. The data storage device 204 may comprise an appropriate combination of magnetic, optical and/or semiconductor memory, and may include, for example, random access memory (RAM), read only memory (ROM), a compact disk and/or a hard disk. The processor 201 and the data storage device 204 each may be, for example, (i) located entirely within a single computer or other computing device; or (ii) connected to each other by a communication medium for remote communication, such as a serial port cable, a telephone line, a network connection or a radio frequency transceiver. Alternatively, the casino server 200 may comprise one or more computers that are connected to a remote server computer for maintaining databases.

The data storage device 204 may store, for example, (i) a program 206 (e.g., computer program code and/or a computer program product) adapted to direct the processor 201 in accordance with the present invention, and particularly in accordance with the processes described in detail hereinafter in regard to the casino server 200; (ii) a customer database 208 adapted to store information regarding individuals (e.g., players who have registered as members of a "players' club" or similar program sponsored by the casino served by the casino server 200; guests registered with a hotel; or other customers or potential customers of a casino, such as those included in a mailing list for promotional materials); (iii) a room database 210 adapted to store information about the individual guest rooms of the hotel served by the casino server 200; (iv) an offer database 212 adapted to store information concerning offers that the casino server 200 may communicate to players from time to time via gaming devices and/or wireless terminals; and (v) a reservation database 214 adapted to store information regarding room reservations made by players and other hotel patrons via a reservation system.

The program 206 may be stored in a compressed, an uncompiled and/or an encrypted format, and may include computer program code that allows the casino server 200 to employ the communications port 202 to:

1. communicate with the gaming devices 104 and the wireless terminal 108 to handle hotel transactions such as check-in and check-out;

2. communicate control information to the room lock mechanism 106 and other room lock mechanisms (not shown);

3. exchange information concerning reservations (e.g., hotel reservations, or restaurant reservations) and reservation confirmations with the hotel reservation system 110;

4. use the gaming devices 104 and/or the wireless terminal 108 to provide one or more offers to players operating the gaming devices 104 and/or the wireless terminal 108, and to receive responses from the players to the one or more offers provided to the players; and/or 5. exchange data with other devices which are not shown concerning transactions chargeable to hotel patrons' room accounts, including restaurant charges, room service charges, telephone charges, and charges for other products and services provided by the hotel to hotel patrons.

The computer program code required to implement the above functions (and the other functions described herein) can be easily developed by a person of ordinary skill in the art, and is not described in detail herein. The casino server 200 may include any peripheral devices (e.g., telephone keypads, handsets, headsets, microphones, speakers, keyboards, computer displays, etc.) required to implement the above functionality. The program 206 also may include program elements such as an operating system, a database management system, and device drivers that allow the processor 201 to interface with computer peripheral devices (e.g., a video display, a keyboard, a computer mouse, etc.).

Note that instructions of the program 206 may be read into a main memory (not shown) of the processor 201 from a computer readable medium other than the data storage device 204, such as from a ROM or from a RAM. While execution of sequences of instructions in the program 206 causes the processor 201 to perform the process steps described herein, hard-wired circuitry may be used in place of, or in combination with software instructions for implementation of the processes of the present invention. Thus, embodiments of the present invention are not limited to any specific combination of hardware and software. The processor 201 also may be in communication with a clock 216 that supplies time and date information to the processor 201 and/or controls the timing of operations of the processor 201. The clock 216 may be a clock external to the processor 201, as indicated, or may alternatively be a clock internal to the processor 201 or a clock embodied within the program 206 (e.g., based on a system clock which is not shown).

The casino server 200 could be implemented as two or more interconnected servers, such as a slot server and a hotel server.

2.2. Gaming Device

Figure 3:
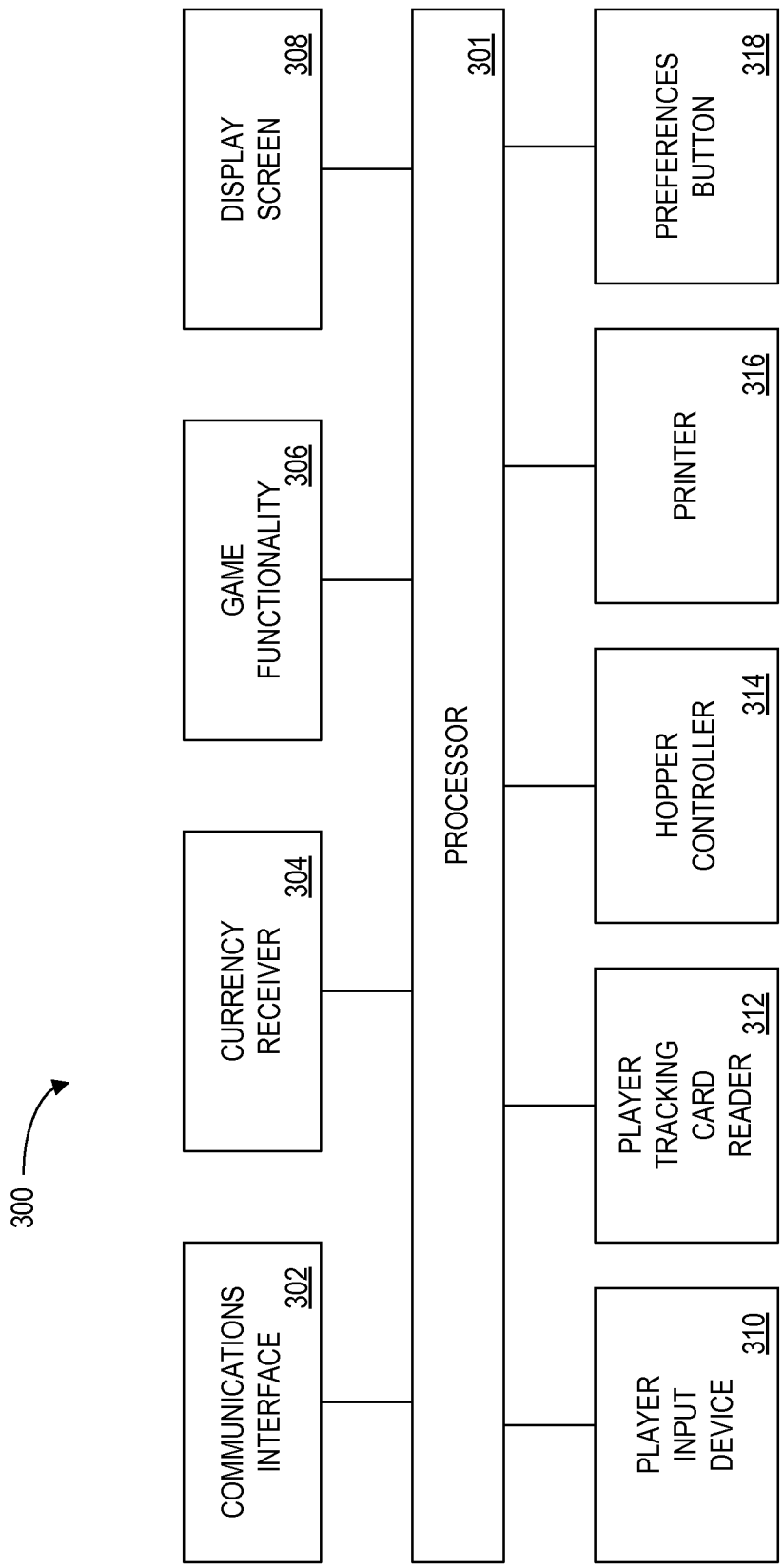
FIG. 3 is a schematic diagram of an exemplary embodiment of a gaming device.

FIG. 3 illustrates an exemplary embodiment of one or more of the gaming devices 104 of FIG. 1. The gaming device 300 may have all of the components of a conventional gaming device such as a slot machine or a video poker machine. The schematic diagram of FIG. 3 is somewhat simplified, and it accordingly should be understood that conventional gaming device components may be present notwithstanding that such components are not explicitly indicated in FIG. 3.

The gaming device 300 may include various well-known devices that allow wagering, including slot machines. Well-known examples of slot machines include, without limitation, mechanical slot machines, video slot machines, video poker machines, video blackjack machines, video keno machines, video bingo machines, pachinko machines, and video lottery terminals. The gaming device 300 may be implemented as a dedicated hardware circuit, an appropriately programmed general-purpose computer, or any other appropriate device including, without limitation, electronic, mechanical or electro-mechanical devices. Accordingly, the gaming device need not include the various exemplary components depicted in FIG. 3.

With reference to FIG. 3, the gaming device 300 comprises a processor 301, such as one or more conventional microprocessors (e.g., one or more INTEL® PENTIUM® processors). The processor 301 is in communication with a communications interface 302, through which the processor 301 communicates with the above-described casino server 200. The communications interface 302 may also include a capability for wireless communication with, e.g., telephones, personal digital assistants (PDAs), and the like.

Although not shown in FIG. 3, there may be associated with the processor 301 conventional volatile and/or non-volatile memory that may function as program storage and/or working memory. The gaming device 300 also includes a conventional currency receiver 304 which is in communication with the processor 301 and is adapted to receive coins and/or bills and/or tokens. The gaming device 300 also includes conventional game functionality (indicated by block 306) which is associated with the processor 301 and may include suitable software for displaying game indicia such as simulated slot reels or representations of playing cards. The game functionality 306 may also include a random number generator and/or other elements required to generate a game outcome. The game functionality 306 may also include mechanical components such as conventional slot machine reels.

The gaming device 300 also includes a display 308 which is driven by the processor 301. Under the control of the processor 301, the display 308 may display game indicia in accordance with the game functionality 306.

The gaming device 300 also includes a player input device 310 that is in communication with the processor 301 and which may include two or more separate devices. For example, the player input device 310 may allow a player to indicate an amount of a wager and to initiate a cycle of game play, such as a spin of mechanical or simulated slot machine reels. Alternatively, in the case of a video poker machine, the player input device 310 may allow the player to select cards to be discarded. In one or more embodiments of the invention, the player input device may permit the player to engage in hotel transactions such as check-in or check-out and/or to enter alphanumeric information. In the case that the display 308 is a touch screen, the display 308 and the player input device 310 may be integrated together.

The gaming device 300 also includes a conventional player tracking card reader 312 which is in communication with the processor 301. As is familiar to those who are skilled in the art, the player tracking card reader 312 is adapted to have a player tracking card interfaced therewith, and to read information from a magnetic stripe on the player tracking card. The information read from the player tracking card may include, for example, a player identifier.

The gaming device 300 also includes a conventional hopper controller 314 which is controlled by the processor 301, and which controls dispensing of coins and/or tokens from a conventional hopper (not separately shown) in response to awarding of a jackpot and/or the player exercising a cash out option.

Also included in the gaming device 300, in one or more embodiments, is a printer 316 which is driven by the processor 301, and which may be used to print out items such as billing statements, access code tickets and/or hotel information, offers or coupons, or cashless gaming receipts (e.g., coupons representing monetary value usable at gaming devices).

Also shown in FIG. 3 is a preferences button 318 connected to the processor 301. In one or more embodiments of the invention, actuation of the preferences button 318 by the player may initiate a hotel transaction and/or an opportunity for the player to request services or benefits from the hotel casino. It should be understood that the preferences button 318 may be integrated with the display 308 (if the display is a touch screen) and/or with the player input device 310.

In one or more embodiments, the gaming device 300 may also include a conventional credit card reader 318. In accordance with conventional practices, the credit card reader 318 may read data such as a credit card account number from a credit card that is interfaced to the credit card reader 318.

In some embodiments, the gaming device 300 may include a card reader (not shown) that is configured to read both player tracking cards and credit cards. In other embodiments, the gaming device 300 may include one or more devices configured to receive one or more of various well-known types of removable media, including, without limitation, floppy disks, player tracking cards, credit cards, debit cards, smart cards, flash memory cards, multimedia cards, and memory sticks.

2.3. Wireless Terminal

Figure 4:
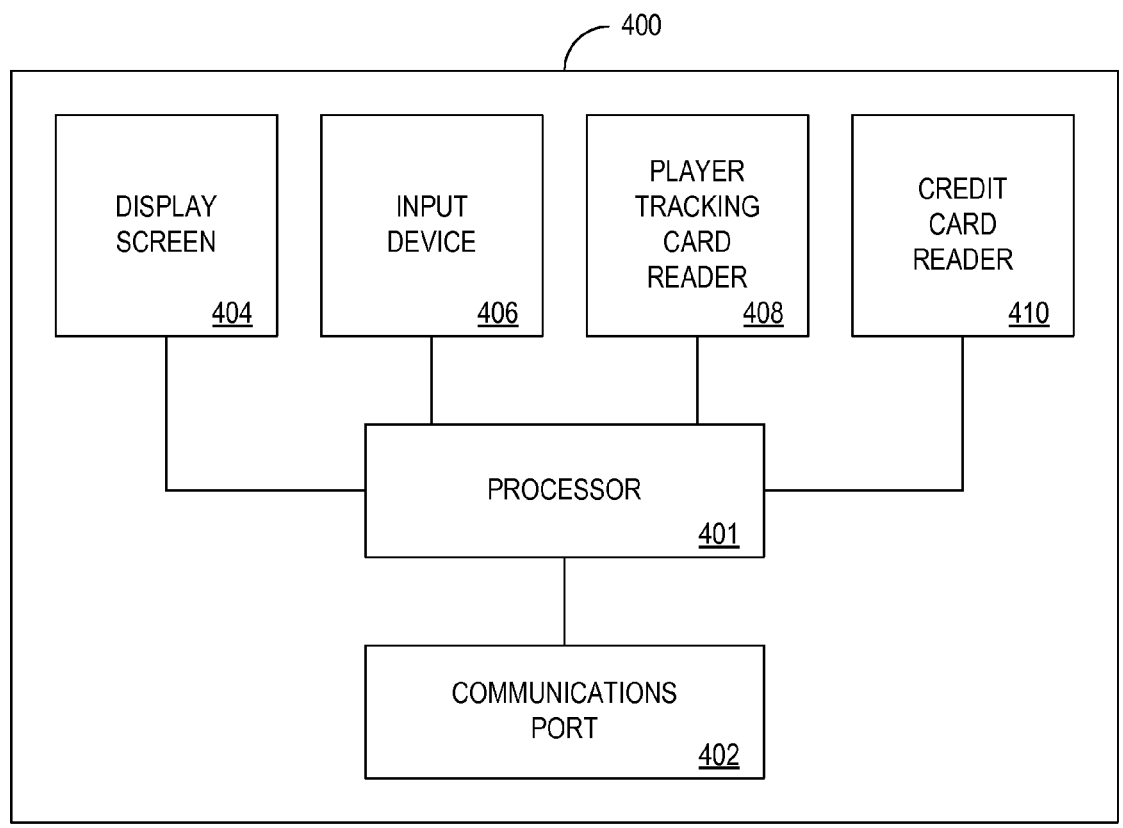
FIG. 4 is a schematic diagram of an exemplary embodiment of a wireless terminal.

FIG. 4 illustrates an exemplary embodiment of a wireless terminal 108. The wireless terminal 400 comprises a processor 401, such as one or more conventional microprocessors (e.g., one or more INTEL® PENTIUM® processors). Although not separately shown, there may be volatile memory and/or non-volatile memory associated with the processor 401. Such memory may be used for program storage, working memory, etc. There may also be one or more mass storage devices, such as hard disks, included in the wireless terminal 400.

The processor 401 is in communication with a communications port 402, which enables the wireless terminal 400 to be in wireless communication with the casino server 200. The communications port 402 may also include a capability for wireless communication with, e.g., telephones, PDAs, and the like.

The wireless terminal 400 also includes a conventional display 404 which is driven by the processor 401. Also included in the wireless terminal 400 are one or more user input devices (indicated by block 406) which may be conventional devices for providing user input to the processor 401. If the display 404 is a touch screen, then it will be appreciated that the display 404 and the input device 406 may be integrated together.

The wireless terminal 400 also includes a conventional player tracking card reader 408, which may be like the player tracking card reader 312 discussed in connection with FIG. 3. The player tracking card reader 408 reads information such as a player identifier from a player tracking card and provides the information to the processor 401. The wireless terminal 400 may also include a conventional credit card reader 410. In accordance with conventional practices, the credit card reader 410 may read data such as a credit card account number from a credit card that is interfaced to the credit card reader 410. The credit card reader 410 then provides the data to the processor 401. The wireless terminal 400 may also include a printer, which is not shown. The printer may print out information of the types described in connection with the printer 316 of the gaming device 300 (FIG. 3).

In general, the wireless terminal 400 may have all of the capabilities of the gaming device 300 except for gaming capabilities. Accordingly, the wireless terminal 400, in communication with the casino server 200, may be adapted to perform hotel transactions such as check-in or check-out and/or may allow the user to state preferences, request benefits or services from the hotel, and/or to receive offers from the hotel. One or more wireless terminals 400 may be placed at the front door of the casino hotel and/or outside the casino hotel or at the curb, to allow hotel guests to conveniently check in or check out of the casino hotel. In some embodiments, the wireless terminal 400 may resemble a conventional kiosk in appearance.

2.4. Room Lock Mechanism

Figure 5:
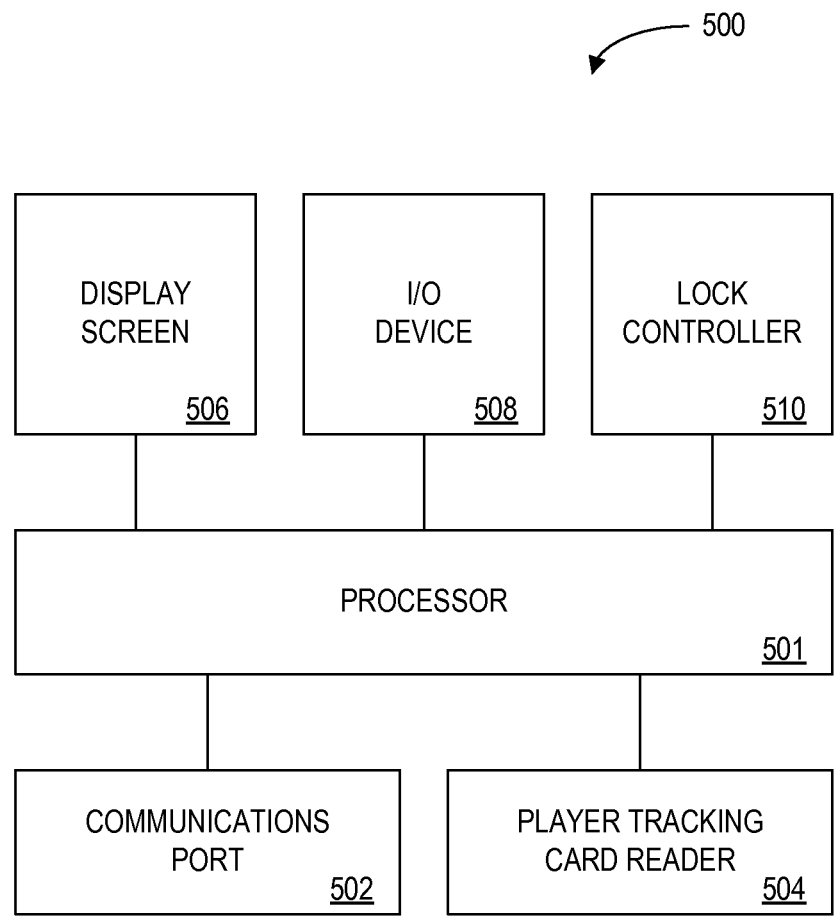
FIG. 5 is a schematic diagram of an exemplary embodiment of a room lock mechanism.

FIG. 5 is a schematic diagram of an exemplary embodiment of the room lock mechanism 106. It will be appreciated that such a room lock mechanism may be installed in or in association with the door of each guest room of the casino hotel.

With reference to FIG. 5, the room lock mechanism 500 comprises a processor 501, such as one or more conventional microprocessors (e.g., one or more INTEL® PENTIUM® processors). Although not separately shown, the room lock mechanism 500 may also include volatile memory and/or non-volatile memory associated with the processor 501. Such memory may be used for program storage, working memory, etc. The processor 501 is in communication with a communications port 502 through which the processor 501 is in communication with the casino server 200.

The room lock mechanism 500 also preferably includes a conventional player tracking card reader 504. The player tracking card reader 504 is adapted to read information such as a player identifier from a player tracking card interfaced to the player tracking card reader 504. The player tracking card reader 504 then provides the information to the processor 501. In accordance with the present invention, the room lock mechanism 500 may operate so that a player tracking card belonging to a player to whom the respective room has been assigned may function as a room key. In addition, or alternatively, entry of an access code may be required to unlock the door. Accordingly, a display screen 506 and an input/output device 508 may be included in the room lock mechanism 500. If the display 506 is a touch screen, the display 506 and the input/output device 508 may be integrated together. The I/O device 508 may take the form of a simple pushbutton input or keypad to be used in inputting an alphanumeric access code. In such a case, the display 506 may be dispensed with.

The room lock mechanism 500 also includes a lock controller 510 which may be a conventional electromechanical device adapted to selectively release the door lock (not separately shown) in response to an instruction or actuation signal from the processor 501.

3. Databases

Exemplary embodiments of the customer database 208, of the room database 210, of the offer database 212 and of the reservation database 214 (shown in association with the casino server 200 as illustrated in FIG. 2) are shown in FIGS. 6-9, respectively. The specific data and fields illustrated in these drawings represent only one embodiment of the records stored in the databases of the invention. The data and fields of these databases, as well as the number of databases, can be readily modified, for example, to include more or fewer data fields. A single database also may be employed. Note that in the databases, a different reference numeral is employed to identify each field of each database. However, in at least one embodiment of the invention, fields that are similarly named (e.g., player identifier fields) store similar or the same data in a similar or in the same data format.

3.1. Customer Database

Figure 6:
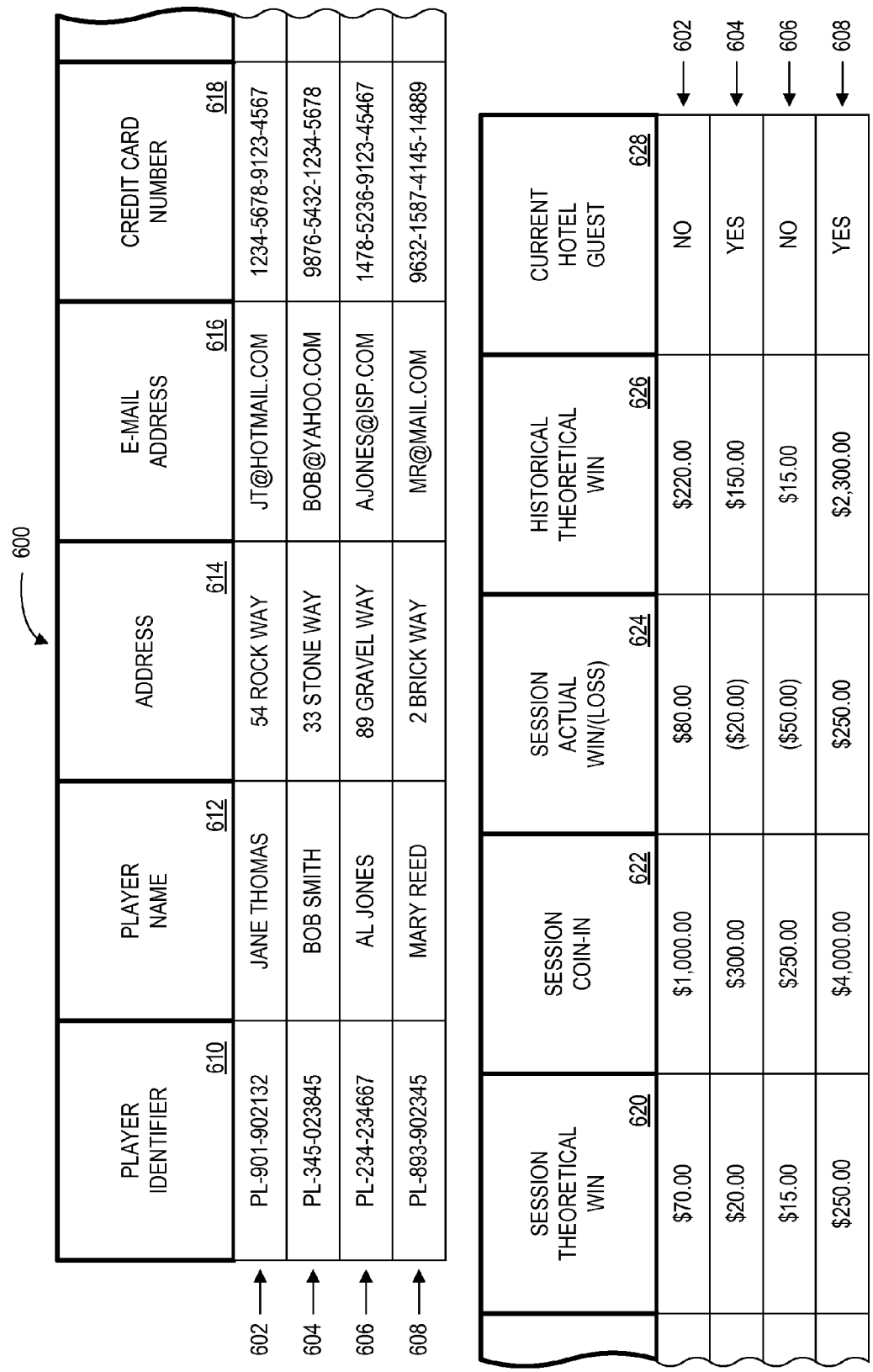
FIG. 6 is a tabular representation of an embodiment of a customer database.

FIG. 6 is a tabular representation of one embodiment of the customer database 208 of FIG. 1. The player database 600 of FIG. 6 contains information related to players who have registered or become members in a players' club or similar program sponsored by the casino hotel served by the casino server 200. (Alternatively, the players could be registered in or members of a players' club sponsored by a group of casino hotels or another organization, and participated in by the casino hotel served by the casino server 200.)

As shown in FIG. 6, a sample of the contents of the player database 600 contains player information related to four players identified in records 602-608, respectively. Specifically, for each player, the player database 600 contains records having fields corresponding to, for example, (1) a player identifier 610, used by the casino server 200 to identify the player; (2) a player name 612; (3) a player mailing address 614; (4) a player e-mail address 616; (5) a credit card number 618 of the player; (6) theoretical win data for a gaming session that the player is currently engaged in (reference numeral 620); (7) data indicating a quantity of coins or other tendered currency or currency equivalent inserted by the player into a gaming device in the current gaming session (reference numeral 622); (8) data indicating an amount that the player has actually won or lost in the current gaming session (reference numeral 624); (9) data indicating total theoretical win information for the player over the course of all of the player's gaming activity at the casino hotel (reference numeral 626); and (10) an indication as to whether the player is currently checked into the hotel (reference numeral 628).

Player identifiers may include identifiers, such as a sequence of digits or a sequence of alphanumeric characters, that uniquely identify a particular player. Player identifiers may include, for example, a player tracking number and/or a credit card account number. In one embodiment, a player identifier may be recorded in a physical form such as by a player tracking card and/or a credit card.

Although not shown in FIG. 6, the player database 600 could include an additional field that stores, for each player, an identifier of a gaming device that the player is currently playing. It will be understood that there would be no entry in such a field at times when the respective player is not currently playing a gaming device. Other player information not shown in FIG. 6 that may be stored within the player database includes player preferences (e.g., non-smoking room), one or more player identifiers corresponding to players or other individuals associated with the player (e.g., family, friends, fellow tour group members, or team members), and/or benefits that the casino hotel customarily provides to the player (e.g., welcome fruit basket in room because of the player's past or anticipated future gaming activity). It will be appreciated that the data in fields 620-626 may be used by the casino hotel to "rate" the level of the player's gaming activity to determine what complimentary benefits ("comps") the casino hotel may offer to the player. Other rating information may also be included in the player database 600.

Note that the customer database 208 (and the room database 210, the offer database 212 and the reservation database 214) may be populated with data provided to the casino server 200 via the communications port 202, and that the data may be provided to the casino server 200 from data entry terminals (not shown), from other computer systems (not shown) and/or from the hotel reservation system 110 (FIG. 1) and/or from any other source.

With reference to the player database 600 of FIG. 6, the record 602 illustrates exemplary data for a player PL-901-902132 (player identifier 610) named Jane Thomas (player name 612) who lives at 54 Rock Way (address 614). Jane Thomas' e-mail address is JT@HOTMAIL.COM (e-mail address 616). Jane Thomas has a credit card number 1234-5678-9123-4567 (credit card number 618). The rating data in fields 620-626 indicates that Jane Thomas has a current session theoretical win of $70.00, a current session coin in amount of $1,000.00, a current session actual win of $80.00 and a historical theoretical win amount of $220.00. Field 628 indicates that Jane Thomas is not currently checked in to the hotel.

3.2. Room Database

The room database 210 contains information related to rooms in the hotel. FIG. 7 is a tabular representation 700 of the room database 210. The tabular representation 700 of the room database 210 contains room information relating to five rooms that are identified in records 702-710, respectively. (In practice, it will be understood that the hotel is likely to have many more than the five rooms recorded in the exemplary embodiment shown in FIG. 7. There may be, for example, hundreds or thousands of rooms in the hotel and recorded in the room database 210.) Specifically, for each room, the tabular representation contains sample records having fields corresponding to, for example, (1) a room identifier 712 that uniquely identifies the room; (2) a room type 714 (such as standard, suite, luxury suite, villa, king bed, etc.); (3) a room rate 716 which indicates a standard or "rack" rate charged for one night's stay in the room; (4) an indication as to whether the room is a smoking room or a non-smoking room (reference numeral 718); (5) an indication of the "status" of the room (i.e., whether the room is occupied or unoccupied; that is whether the room is currently assigned to a hotel guest; reference numeral 720); and (6) an access code 722 that is currently assigned to the room lock mechanism 500 for the room to control unlocking of the room lock mechanism 500. Additional fields that may be included in the room database 210, but are not shown, might be the physical room number (i.e., the number which appears on the door of the room), a player identifier field to indicate a player to whom the room is currently assigned and/or an indication as to whether the room is suitably equipped to accommodate handicaped hotel guests.

Room identifiers may include identifiers such as, without limitation, a sequence of digits or a sequence of alphanumeric characters, that uniquely identify a particular room. In one embodiment, a player identifier may be recorded in a physical form such as by a player tracking card and/or a credit card.

Access codes may include, for example, a sequence of digits or a sequence of alphanumeric characters that grants a player access to his hotel room. In one embodiment, the room access code may be generated and stored on the casino server. In addition, upon generating the room access code, the casino server may transmit the code to the player's hotel room locking mechanism so that the player is required to input the code at the hotel room door in order to gain access to his or her hotel room. A room access code may also refer to a code specified or generated by a player or entity other than a casino server. For example, a player may be prompted to indicate a room access code, or a gaming device may generate a room access code. In some embodiments, the room access code is not an alphanumeric code. For example, a room access code may be based on biometric information about a player (e.g., a fingerprint, or a retinal scan). The depicted fields of FIG. 7, for example the various room identifiers and room access codes, are for illustration only. Various other forms of identifiers and codes are described herein and still others will be readily apparent to those of skill in the art.

3.3. Offer Database

The offer database 212 contains information related to offers that may be communicated from the casino server 200 to players via the gaming device 300 and/or the wireless terminal 400. FIG. 8 illustrates a tabular representation 800 of the offer database 212. As shown in FIG. 8, the tabular representation 800 of the offer database 212 contains information for six offers identified in records 802-812, respectively. Specifically, for each offer, the tabular representation 800 contains sample records having fields corresponding to, for example, (1) an offer identifier 812 that identifies the offer; and (2) an offer description 814 that describes the offer. Possible offers may include, but are not limited to, one or more of: a free shoe shine, gaming credits (e.g., for use at one or more of the gaming device 300), a complimentary copy of a newspaper, free soft drinks from the room refrigerator, a coupon for a hotel restaurant, a free room upgrade, and improved payouts or odds or other benefits associated with game play in the gaming device 300 (e.g., jackpots pay double for a certain time period). The offer database 212 may include additional fields, which are not shown, such as a description of what the player has to do to qualify for the offer (e.g., check in and/or check out using a gaming device 300 or the wireless terminal 400; engage in gaming activity with a gaming device 300 for a certain period of time, or wager a certain amount of money during gaming activity at a gaming device 300; defer checking in to a room for which the player has a reservation; check out early from a room that has been assigned to the player; relinquish a room that has been assigned to the player or relinquish a room reservation; purchase a meal or a drink at a hotel restaurant or bar; defer, limit or eliminate cleaning of the player's room; move to another, commonly-owned hotel).

3.4. Reservation Database

Figure 9:
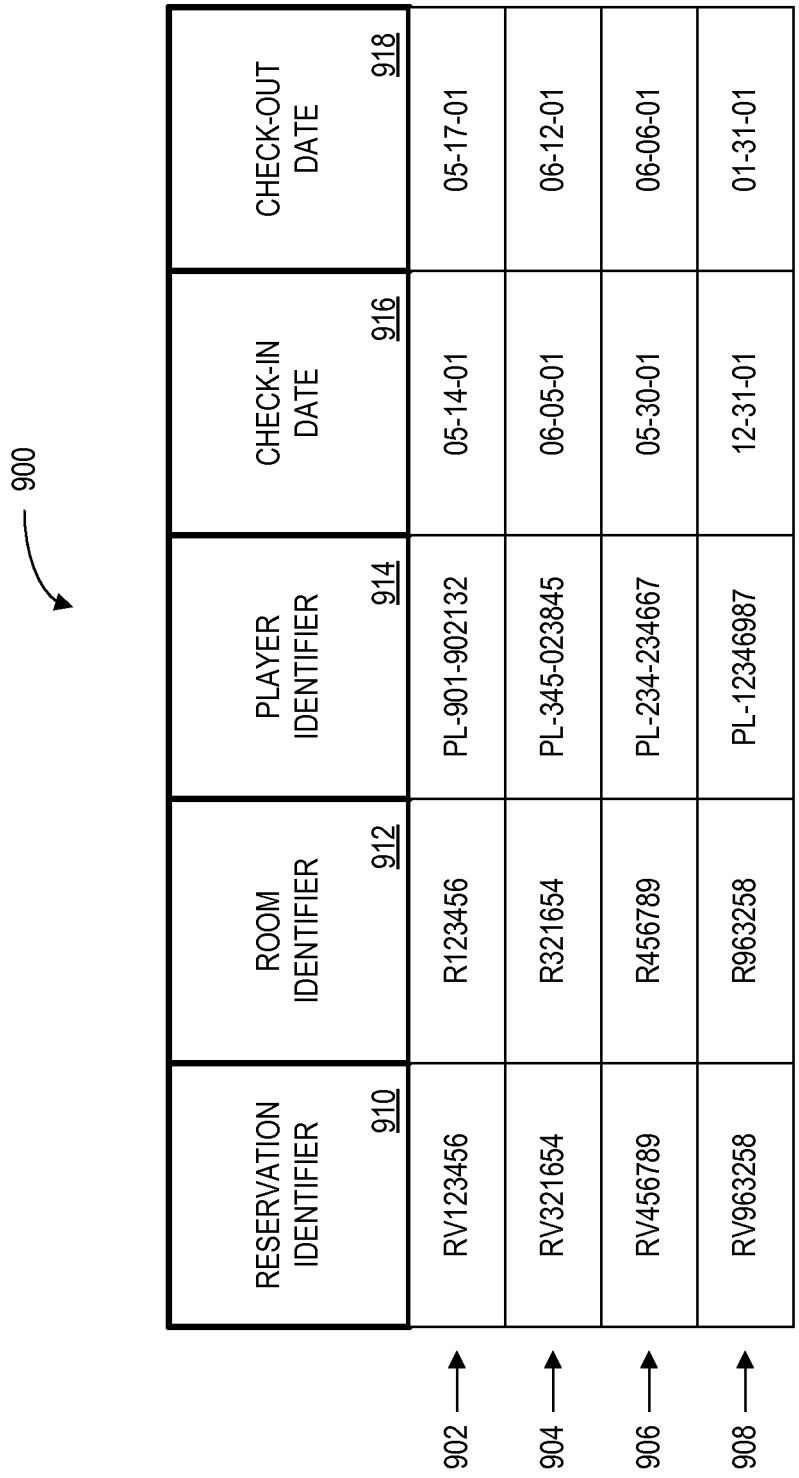
FIG. 9 is a tabular representation of an embodiment of a reservation database.

The reservation database 214 contains information related to room reservations made by players or other hotel patrons. It will be appreciated that some or all of the room reservations may have been made through the hotel reservation system 110 (FIG. 1). FIG. 9 illustrates a tabular representation 900 of the reservation database 214. As shown in FIG. 9, the tabular representation 900 of the reservation database 214 contains information for four reservations identified by records 902-908, respectively. Specifically, for each room reservation, the tabular representation 900 contains sample records having fields corresponding to, for example, (1) a reservation identifier 910 that identifies the room reservation; (2) a room identifier 912 that identifies a room that has been assigned to satisfy the reservation; (3) a player identifier 914 that identifies a player who made the reservation; (4) a check-in date 916; and (5) a check-out date 918. Other fields that may be included in the reservation database 214 but which are not shown, include a confirmation number, a credit card account number to which charges for the room are to be applied, the physical room number (i.e., the number of the room which appears on the door of the room), fields for requested room characteristics, such as room type, smoking/non-smoking, handicap accessible, etc., and possibly additional information concerning the player, including name, address, etc. The reservation database 214 may also include accounting fields which record all transactions and/or charges that are chargeable to the player's room account, such as room charges, meals, room service and other services or items ordered by the player and charged to the player's room account. Alternatively, such accounting fields may be included in the room database 210, or in a separate database (not shown) which is accessible by at least one of the room identifier, the reservation identifier and the player identifier.

4. Processes

FIGS. 1A-10B together form a flow chart of an exemplary process 1000 performed by the system 100 of FIGS. 1-9 in connection with an automated hotel check-in operation. The process 1000 may be embodied within computer program code of the program 206 of the casino server 200 and may comprise a computer program product.

Figure 10A:
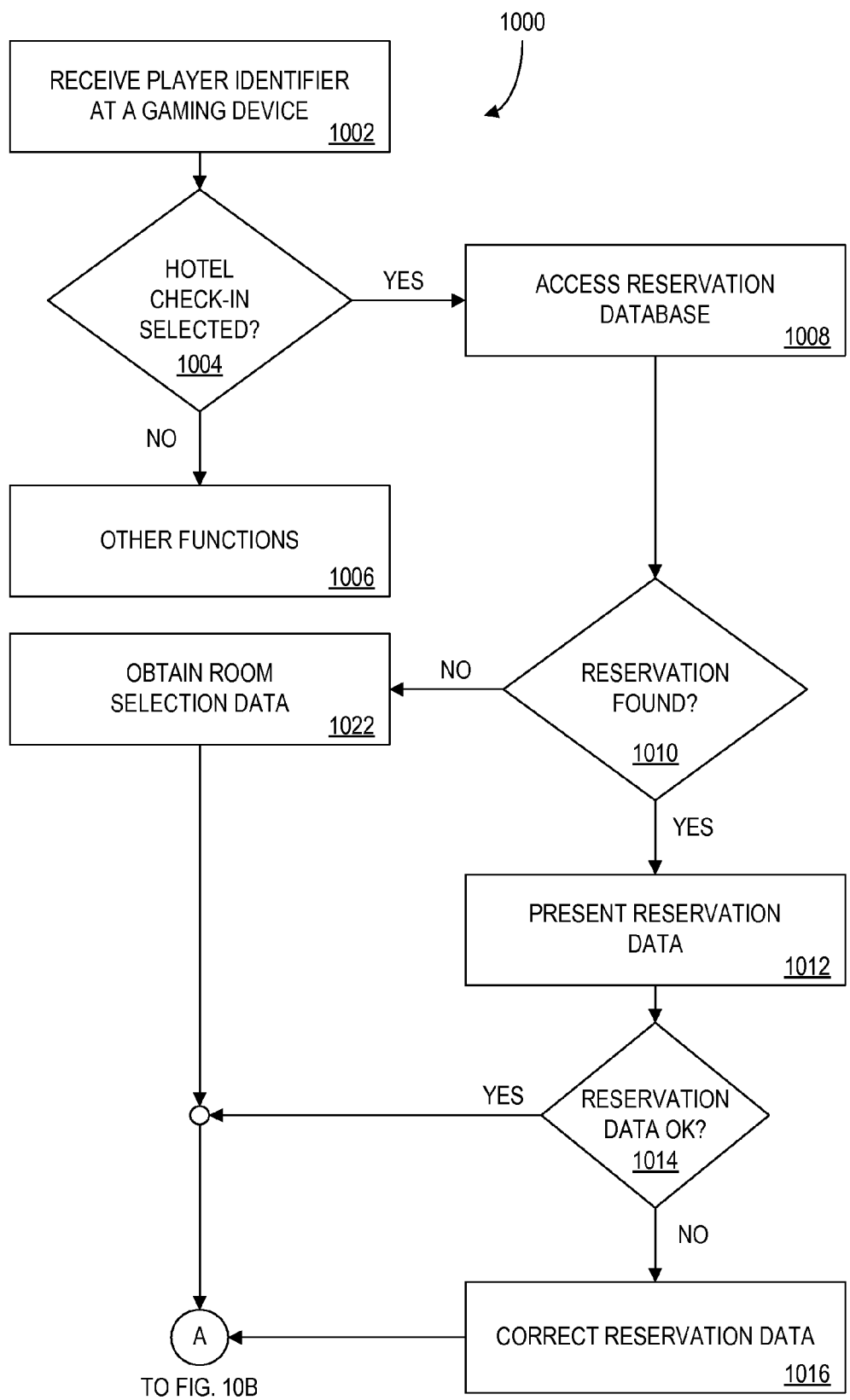
FIGS. 10A and 10B together are a flow chart of an exemplary process according to one or more embodiments.

With reference to FIG. 10A, the process 1000 begins in step 1002, at which a player identifier is received via a gaming device 300. This may occur, for example, by a player interfacing (swiping or inserting) his player tracking card into the player tracking card reader 312 (FIG. 3) of the gaming device 300. Alternatively, the player may communicate the player identifier to the gaming device 300 by wireless communication via a hand-held device such as a PDA, a cellular telephone, or a notebook computer. As another alternative, the gaming device 300 may be equipped with a credit card reader (not shown) and the player identifier (or alternatively a credit card account number) may be entered into the gaming device 300 by interfacing the player's credit card or debit card with the credit card reader. The player identifier or credit card number could also be entered by the player typing into a keyboard or touch screen, or by speaking into a microphone. Alternatively, the player identifier may comprise biometric data (e.g., a fingerprint, a voice print, or a retinal scan) input via an appropriate biometric device (not shown). Once the player identifier or credit card number has been entered into the gaming device 300, the player identifier or credit card number is communicated from the gaming device 300 to the casino server 200 and the player database 600 is accessed to retrieve the record for the player. The reservation database 214 may also be accessed to determine whether the player is holding a room reservation. In response to the entry of the player identifier, the gaming device 300, upon suitable direction from the casino server 200, may present a personalized greeting to the player.

As another alternative, the reservation database 215 may not be accessed unless and until the player selects a check-in option (as indicated at step 1004 (FIG. 10A)). The hotel check-in option may be selected in response to a suitable prompt presented to the player via the display 308 (FIG. 3) of the gaming device 300. If the hotel check-in option is not selected, then other functions (step 1006, FIG. 10A), such as conventional gaming activity, may take place. If the hotel check-in option is selected, and if the reservation database 214 was not previously accessed, then the casino server 200 accesses the reservation database (step 1008) in response to selection of the hotel check-in option. It is then determined (step 1010) whether a room reservation for the player is stored in the reservation database 214. If so, then the casino server 200 may instruct the gaming device 300 to display to the player, via the display 308 of the gaming device 300, reservation data (step 1012). For example, the reservation information may be presented as a reservation confirmation page, such as an electronic display of information regarding the player's reservation of a hotel room. In other embodiments, the gaming device 300 may print a representation of reservation information (e.g., using the printer 316). The reservation information may, for example, include all of the reservation information customarily provided on a hotel registration card (e.g., the player's name, address, credit card number, and/or e-mail address) plus additional data such as dates of check-in and check-out, room characteristics, etc. The player may then be prompted to review the reservation data (e.g., as displayed on a reservation confirmation page) and to indicate whether the information contained therein is correct. If it is determined (step 1014) that the player has indicated that the information is not correct, then the player may be prompted to enter corrected information (step 1016). The player may enter the corrected information via the player input device 310 (FIG. 3) of the gaming device 300, which may, as noted above, be a touch screen (display 308).

After an indication that the reservation confirmation page is correct, or after correction of the reservation data, the casino server 200 may instruct the gaming device 300 to display to the player via the display 308 of the gaming device 300 preferences data (step 1018, FIG. 10B), such as various preference options or other information, from which the player may select preferred features and services in connection with the player's hotel stay.

In some embodiments, preferences information may be represented to a player as an electronic display. An exemplary preferences page 1100 is illustrated in FIG. 11. In accordance with one or more embodiments, the preferences page is a menu or form presented to a player to display hotel offers and/or features, products, and/or services that may be selected by the player in connection with the player's hotel stay. Exemplary preference options for food, entertainment, literature, hotel room and hotel cleaning are depicted.

Not all of the information depicted in FIG. 11 is required, and various substitutions, deletions and other changes to the representation will be readily apparent to those of ordinary skill in the art. For example, the literature category may not be used in some embodiments. The depicted fields, for example, the depicted options within each category, are for illustration only. Various other forms of categories and options are described herein and still others will be readily apparent to those of skill in the art. Further, other arrangements of preference categories and options will be readily appreciated by those of skill in the art.

In connection with selection of preferences, the gaming device 300 may present to the player an image (actual or simulated) of a room or a type of room that the player may select. Such an image may be a still image (e.g., a photograph) or a moving image (e.g., a video, or an animated depiction). The player may then be prompted to select his preferences from the preferences page. Selection of preferences by the player is represented by step 1020. The player may also be permitted to enter additional or supplemental preferences in text form.

Considering again step 1010 (FIG. 10A) if it is found that the player does not have a reservation, then the player is prompted to input data required to allow the player to check in. Such data may include the player's desired length of stay (i.e., the player's desired check-out date) and room preferences such as room type, smoking/non-smoking, etc. The inputting of the room selection data is represented by step 1022 in FIG. 10A. At this step, registration information such as the player's name, address and credit card number may be retrieved automatically from the player database 600. Alternatively, some or all of this information may be entered by the player via the player input device 310 of the gaming device 300. Following entry and/or retrieval of room selection data are the previously described steps of presenting and selecting from the preferences information (steps 1018 and 1020).

Next, the casino server 200 assigns a room to the player (step 1024, FIG. 10B) in accordance with either the reservation information (possibly collected at step 1016, FIG. 10A) or in accordance with the room selection data collected at step 1022. The assignment of a room to the player may entail the casino server 200 populating the room identifier field 912 (FIG. 9) of the record of the reservation database 214 corresponding to the player with a particular room identifier that corresponds to an unoccupied room that satisfies the room characteristics desired by the player. In this way, it will be appreciated that the room identifier for the assigned room is associated with the player identifier corresponding to the player to whom the room is assigned. In addition, the corresponding record for the assigned room in the room database 210 (FIG. 7) may be modified such that the entry in the status field 720 is changed from "unoccupied" to "occupied". If the room database 210 includes a player identifier field (not shown) then the player identifier of the player to whom the room has been assigned may be entered into the player identifier field for the record corresponding to the room that has been assigned.

If there are no rooms available that match the player's preferences, but other rooms are available, the player may be invited via the gaming device 300 to change his or her preferences to match an available room. Room assignment may then take place.

Referring once again to FIG. 10B, after assignment of the room to the player, the casino server 200 may generate an access code (step 1026) to be used to control operation of the room lock mechanism 500 for the assigned room. In one embodiment, the casino server may randomly generate a room access code. This may be done each time a room is assigned, such that a unique code is generated for each player's stay in the hotel. Such a randomly generated access code would be very difficult for a would-be thief to guess or predict. As an alternative, the room access code may be determined through cryptographic encoding of information related to the player, such as the player identifier. In another embodiment, the casino server 200 may retrieve the predetermined access code that has previously been assigned to the room and is stored in the room database 210. Assuming that the access code has been randomly or cryptographically generated, or otherwise generated specifically for the player's stay in the hotel, the access code may be entered into the access code field 722 (FIG. 7) of the record which corresponds to the assigned room. In this way, the room access code is associated with the room identifier for the assigned room.

Referring once more to FIG. 10B, in step 1028, the casino server 200 causes the gaming device 300 to communicate to the player information regarding the room assignment. This information may include, for example, the physical room number for the assigned room. Also included in the room assignment information may be the access code to be entered by the player into the room lock mechanism 500 to unlock the door of the assigned room. The information provided to the player at this time may also include a map of the hotel and/or directions to the assigned room. The room assignment information may be displayed on the display 308 of the gaming device 300 and/or may be printed out by the printer 316 of the gaming device 300. It may be especially advantageous to print out the access code for the player, so that the player is not required to memorize the access code. In addition, or alternatively, the player may be informed that the player's player tracking card may be used as a room key. The physical number of the assigned room may also be printed out by the printer 316 of the gaming device 300.

If one or more other individuals will be occupying the room with the player, the casino server 200 may cause the gaming device 300 to prompt the player to provide information for identifying any other players with whom the player is associated (e.g., family, friends, hotel roommates, fellow tour group members, or team members). For example, the gaming device 300 may prompt the player to interface to the gaming device 300 the player tracking cards of the other individuals so that they may be identified as other occupants of the room and enabled to use their player tracking cards as room keys. Or, if necessary, the player may be instructed to obtain additional player tracking cards for the other individuals.

Then, in step 1030, the casino server 200 transmits to the room lock mechanism 500 for the assigned room data that is to be used by the room lock mechanism 500 in determining that the door to the assigned room is to be unlocked. For example, the transmitted data may include both the player identifier for the player to whom the room is assigned and the access code that was generated in step 1026. As referred to herein and in the appended claims, transmitting the player identifier to the room lock mechanism 500 may include transmitting to the room lock mechanism 500 only a portion (e.g., the last n digits) of the player identifier. Based upon the transmitted data, the room lock mechanism 500 for the assigned room may operate such that the room door is unlocked upon the player interfacing his or her player tracking card to the player tracking card reader 504 (FIG. 5) of the room lock mechanism 500, plus entry via the input/output device 508 of the access code. For example, the room lock mechanism 500 may read the player identifier from the player tracking card and compare the read player identifier with the player identifier data transmitted to the room lock mechanism 500 by the casino server 200. If the read player identifier and the transmitted player identifier match, and the proper access code has been entered, the room lock is opened.

Alternatively, only one of interfacing the player tracking card and entry of the access code may be required to unlock the door. In another embodiment of the invention, no access code is used, and only interfacing of the player tracking card to the player tracking card reader 504 is required to unlock the door. In this embodiment, the input/output device 508 and the display screen 506 may be omitted from the room lock mechanism 500. In another embodiment, the player tracking card is not used as a room key and entry to the room is obtained by entering the access code into the input/output device 508 of the room lock mechanism 500. In this case, the player tracking card reader 504 may be omitted from the room lock mechanism 500.

It is also contemplated that the access code may be transmitted to the room lock mechanism 500 by being magnetically written on the player tracking card by the gaming device 300 and then read by the player tracking card reader 504 of the room lock mechanism 500. In such an arrangement, the player tracking card reader 312 (FIG. 3) of the gaming device 300 may be provided with a magnetic writing capability.

According to other embodiments of the invention, the room lock mechanism 500 need not be in communication with the casino server 200 and need not be electronic. The room lock mechanism 500 could be operable, for example, by a conventional mechanical or data-based key, which could be provided to the player by a hotel representative.

Figure 10B:
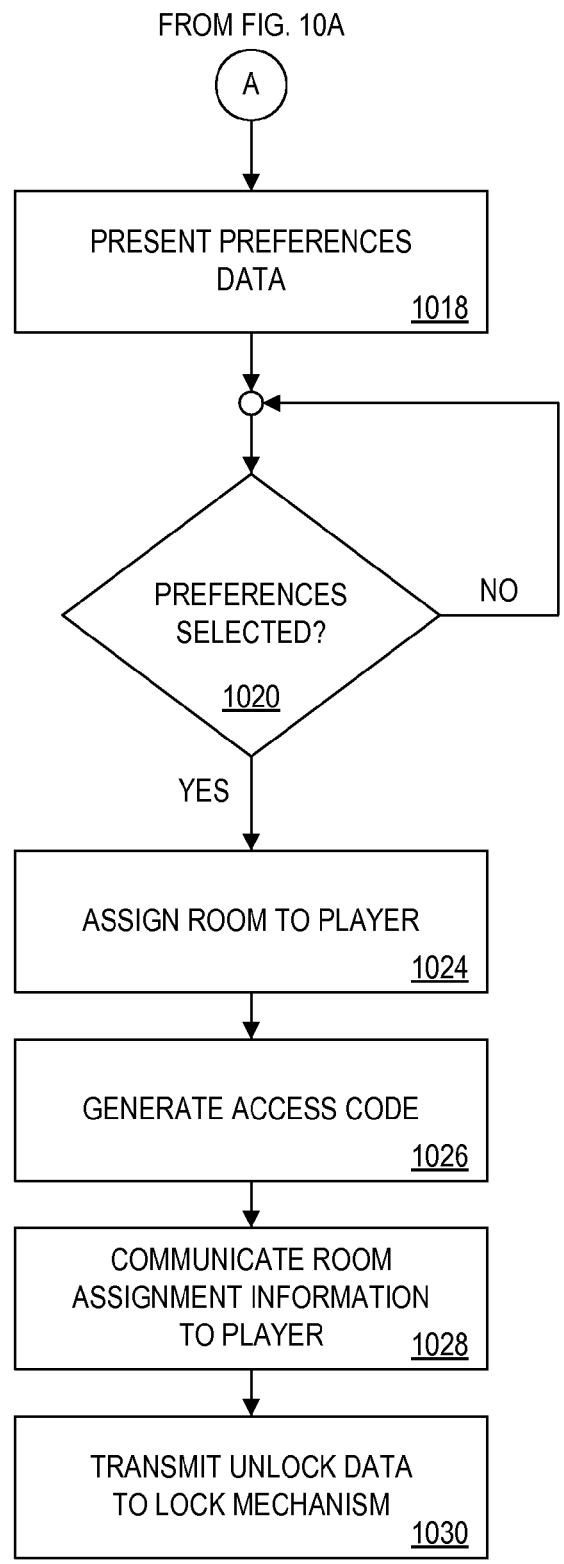

Upon completion of the check-in process of FIGS. 10A-10B, the player may proceed with conventional gaming activity on the gaming device 300.

If, at the time the player wishes to check in, no rooms are currently available, the player may be placed on a waiting list maintained by the casino server 200. When a room becomes available for the player, he or she may be so advised via a gaming device 300 which the player is playing. Check-in may then occur as described in connection with FIGS. 10A-10B.

Figure 12:
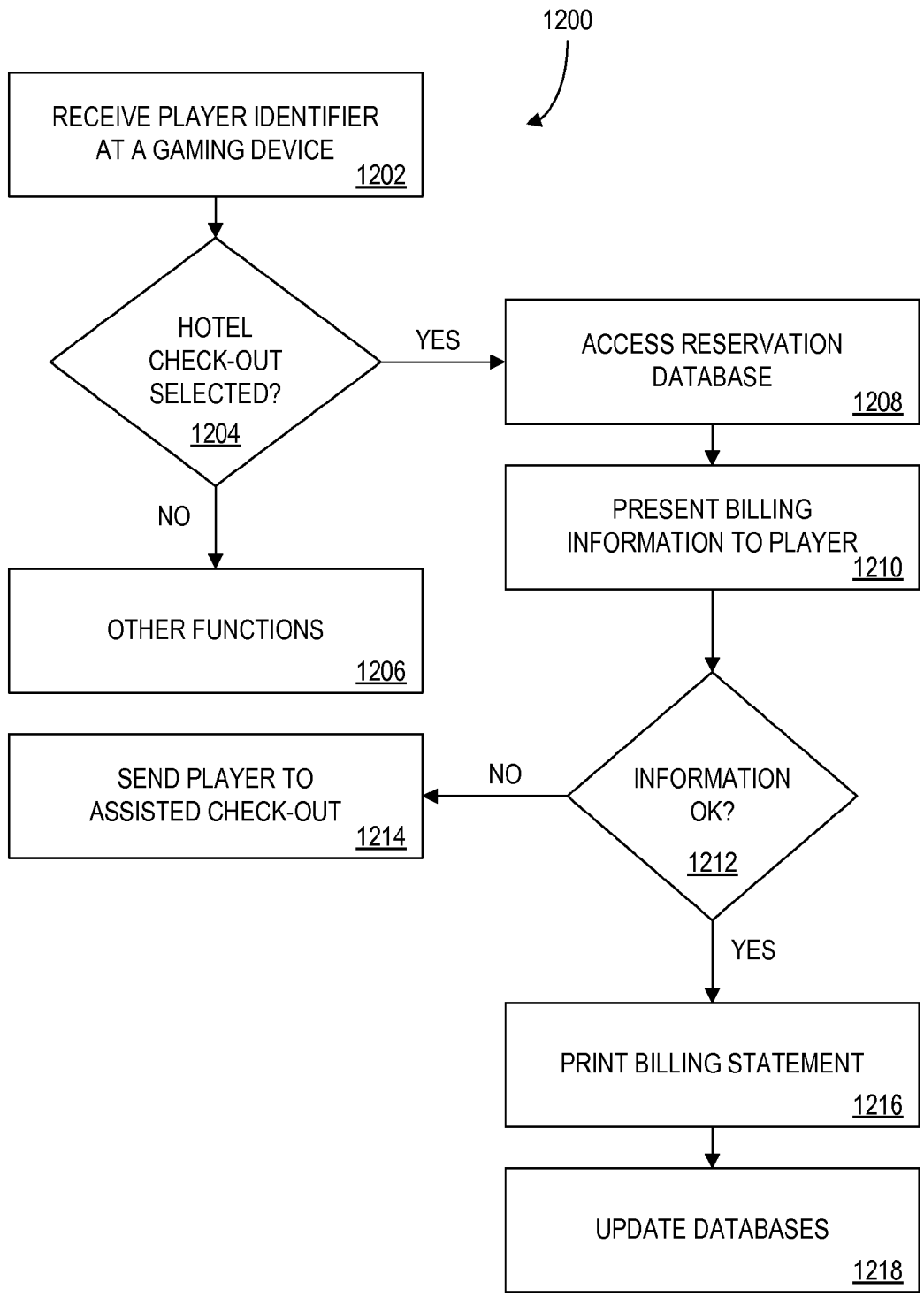
FIG. 12 is a flow chart of an exemplary process according to one or more embodiments.

FIG. 12 is a flow chart of an exemplary process of the system 100 of FIGS. 1-9 in connection with a check-out operation. The process 1200 may be embodied with computer program code of the program 206 of the casino server 200 and may comprise a computer program product. Initially in the process 1200, at step 1202, a player identifier is received via a gaming device 300. As described in connection with step 1002 (FIG. 10A), receiving of the player identifier may occur by the player interfacing his or her player card to the player tracking card reader 312 (FIG. 3.) of the gaming device 300 and by allowing the gaming device 300 to read the player identifier from the player tracking card. Alternatively, the player identifier may be wirelessly transmitted to the gaming device 300 via a hand-held device carried by the player, as also described above in connection with step 1002. After the player identifier is received, the player may be given the option to select a check-out procedure. This may be done by displaying a suitable message on the display 308 (FIG. 3) of the gaming device 300. If it is determined that the player has not selected the check-out option (step 1204, FIG. 12) then other functions (step 1206) may be performed, such as conventional gaming activities.

If the check-out option is selected in step 1204, then the casino server 200 may access the reservation database 214 (step 1208). As noted before, the reservation database 214 may include accounting fields, which are not shown, to record all transactions and/or charges that are chargeable to the player's room. Alternatively, such information may be stored in the room database 210, in fields that are not shown, or in a separate database, that is not shown, in which room charges are stored. In any case, the casino server 200 retrieves billing information reflecting all charges attributable to the player's stay at the hotel. The casino server 200 then instructs the gaming device 300 to present the billing information to the player (step 1210). For example, the billing information may be displayed on the display 308 (FIG. 3) of the gaming device 300. The player may then be prompted to indicate whether he or she approves of the billing information. A determination as to whether the player has indicated approval of the billing information is made in step 1212. If the player indicates disapproval of the billing information, then the casino server 200 may cause the gaming device 300 to display a message indicating that the player should seek assistance with check-out at the hotel registration desk (step 1214).

In some embodiments, the player may be given the opportunity to have one or more items removed from the bill in return for one or more of: (a) playing the gaming device 300 (and/or any other gaming device) for a certain period of time; (b) wagering a certain amount; (c) agreeing to accept a reduced payout or less favorable odds in future game play; (d) making a future reservation at the hotel; (e) agreeing to dine at a hotel restaurant; (f) accepting a cross-subsidy/third party offer; (g) agreeing to establish a certain threshold credit balance at the gaming device 300; and (h) answering one or more survey questions. Of course, the player need not disapprove of the item to be removed, or of any item on the bill, in order to receive such an offer. Items may also be removed at times other than at check-out. Credits and/or discounts may also be earned that are not related to any particular item or items on the bill, and/or that do not correspond to the removal of an item or items from the bill. For example, the player may earn a $5 discount or credit applied to the total bill.

If in step 1212 it is determined that the player has indicated approval of the billing information, then check-out can be automatically completed. In such a case, the casino server 200 instructs the gaming device 300 to print out an itemized check-out statement (step 1216) via the printer 316 (FIG. 3) of the gaming device 300. In addition, as indicated in step 1218, the casino server 200 may update its databases to indicate that the player has checked out of his assigned room. For example, the record corresponding to the assigned room may be modified by changing the entry in the status field 720 (FIG. 7) from "occupied" to "unoccupied". Also, concerning the reservation database 214, the record corresponding to the player's reservation and hotel stay may be purged from the database and suitable information may be stored in an archival database, which is not shown. Furthermore, a billing database (not shown) may be updated to cause the player's hotel stay to be charged to the player's credit card account.

Upon completion of the check-out process of FIG. 12, the player may proceed with conventional gaming activity on the gaming device 300.

Although the check-in process of FIGS. 10A-10B and the check-out process of FIG. 12 have been described in connection with a player interacting with a gaming device 300, it should be understood that those processes may alternatively be performed in conjunction with a player interacting with the wireless terminal 108 (FIG. 1).

5. Additional Embodiments

It is contemplated to modify the check-in process of FIGS. 10A-10B and/or the check-out process of FIG. 12 so as to include interaction between the player and hotel personnel. In some embodiments, at any time after the player identifier is received (step 1002), a hotel representative may be signaled to assist the player with check-in. For example, the casino server 200 may signal the hotel representative via a wireless terminal carried by the hotel representative, or via a visible or audible signal (e.g., via a display at a workstation manned by the hotel representative). In another example, the gaming device 300 could emit a visible or audible signal (such as a flashing light) to call a hotel representative to assist the player. The hotel representative could meet with the player at the gaming device 300 and assist the player with check-in via the gaming device 300 and/or the wireless terminal. Similarly, when check-out is desired, as indicated at step 1204 of FIG. 12, a hotel representative could be signaled to go to the gaming device 300 to assist the player with check-out.

The player, for example, could be permitted to confirm a reservation with the hotel representative, to indicate preferences, and/or to approve check-out information. The player may be able to sign a corresponding document printed out by the gaming device 300 or provided by a hotel representative, and provide the signed document to the hotel representative as part of a check-in or check-out process. A hotel representative could receive a room key from, or deliver a room key to, the player. In some alternative embodiments, a porter may be signaled to come to the gaming device 300 to pick up the player's luggage and/or escort the player to his room, or to remove the player's luggage from the room.

As still another alternative, test input/display, a microphone and headset arrangement and/or a video display at the gaming device 300 might be used to allow the player to communicate with a remotely-located hotel representative for the purpose of check-in or check-out.

The player could be allowed to provide a communication address (e.g., telephone number, an email address, or a pager number) at which the player could receive a message or reminder from the hotel. For example, the player could provide a cellular telephone number. The hotel could call the number, for example, when the player's room is ready. Alternatively, the player could be provided with a pager that would be used to inform the player, for example, when his room is ready, or when a hotel representative is available to assist the player with check-in or check-out.

In addition to, or instead of the check-in and check-out processes described above, the player may interact with the gaming device 300 in regard to other transactions related to his or her hotel stay and/or in other ways that do not involve gaming activity.

In some embodiments, the gaming device 300 and the casino server 200 may be operated as a messaging or communication system. For example, the player may be permitted to retrieve and manage telephone messages via a gaming device 300. If such an option is to be provided, it will be understood that a conventional voice mail system (not shown) may be interfaced to the casino server 200. When the player receives or has received a telephone message, an indication thereof is provided from the voice mail system to the casino server 200. The casino server 200 then instructs a gaming device 300 with which the player is engaged in gaming activity to display a message or an icon or other indication to inform the player that he or she has a phone message. By selecting the icon or with another suitable input, the player may instruct the gaming device to retrieve and reproduce the phone message. The phone message may be transmitted from the voice mail system to the casino server 200 and then converted from speech to text. Then the resulting text can be displayed to the player via the gaming device 300. Alternatively, the phone message may be transmitted from the casino server 200 to the gaming device 300 in the form of a voice file, and the voice file may be audibly reproduced via a loudspeaker (not shown) or a headset (not shown) provided at the gaming device 300.

In similar fashion, the player may be allowed to manage, retrieve and/or send messages (e.g., electronic mail, instant text messages, discussion forum postings, bulletin board postings) via the gaming device 300. For example, a player may post a message on a virtual bulletin board operated by the casino server 200. Other players may access the bulletin board via a gaming device and view the posted message. In some embodiments, only associated players (e.g., family members, roommates, or fellow members of a tour group) may view the message.

In another example, players may be allowed to locate each other and/or to send text messages to each other. For instance, a player may be able to request information about the location (or approximate location) of a particular player or group of players or about recent activity of such players, and/or may request any messages by such players. Alternatively, the casino server 200 may automatically provide such information or messages to the player based on the player's preferences. The casino server 200 may be able to approximate a location of an associated player or determine activities of an associated player based on the associated player's use of a corresponding credit card or player tracking card (e.g., at a restaurant, at a gaming device 300, or at a gift shop). This information may enable the casino server 200 to locate an associated player at a particular gaming device 300, or in a particular part of the casino, and provide an indication of the associated player's location to the inquiring player at a gaming device 300. The casino server 200 could then provide an indication of the approximate location and/or activity to the inquiring player at a gaming device 300.

In some embodiments, the gaming device 300 and the casino server 200 may be operated as a scheduling system. The player may be permitted to store, retrieve, and manage appointments via a gaming device 300. Personal information managers, organizers, and scheduling applications are well known to those having ordinary skill in the art and may be configured to allow for interaction with a user via a gaming device 300. A scheduling system may be integrated with or separate from a messaging system such as described above. In one example, the player may indicate via the scheduling system that he plans to eat dinner from 6 p.m. until 7 p.m., and then plans to play slot machines from 7 p.m. until 8 p.m. In some embodiments, the player may receive recommendations and/or offers related to appointments scheduled by the player. For example, the player may request via a gaming device 300 a suggestion on where to eat during his planned dinner period, and may indicate further information and/or preferences, such as a preferred type of cuisine, a number of people in his dinner party, and an estimated amount to be spent on dinner. The casino server 200 and/or a hotel representative may search a database of restaurants and/or offers in order to identify one or more recommendations and/or offers based on the player's request. For example, the player may receive via the gaming device 300 an offer for four entrees for the price of three entrees at a hotel restaurant.

In some embodiments, the player may request suggestions for activities or events to do during periods of time in which no appointments are scheduled. For example, the player may indicate via a gaming device 300 that the player wishes to receive a suggestion for an activity between 8 p.m. and 11 p.m. at which smoking is not permitted. The casino server 200 and/or a hotel representative may search a database of activities and/or offers in order to identify one or more events meeting the player's requirements. For example, the player may receive via the gaming device 300 an offer to attend a show, or to participate in a bingo game in a smoke-free room.

In some embodiments, the casino server 200 and/or the gaming device 300 may provide one or more offers for unscheduled time without receiving a request from the player. In one or more embodiments, the player may access the scheduling system via a Web server operated by the hotel, for example, prior to or during the player's stay at the hotel.

Players operating the gaming device 300 may also be permitted to transmit messages via the gaming devices to request various services and/or benefits from the casino hotel. For example, a player may transmit a message via a gaming device 300 (by using the player input device 310, FIG. 3, of the gaming device 300) to request the hotel housekeeping staff to clean the player's room.

Moreover, the casino server 200 may employ the displays 308 of the gaming device 300 to communicate messages to particular ones of the players operating the gaming device 300. One such message could be, "Mr. Smith, your room number 336 is now ready." Other messages may communicate offers made by the hotel to the players. For example, the casino server 200 could offer compensation (such as gaming credit to be employed on the gaming device 300) to a player to switch rooms (e.g., from a non-smoking to a smoking room, in the event that there is a shortage of non-smoking rooms). The player's response to the offer may be provided via the player input device 310 (FIG. 3) of the gaming device 300.

The player may be offered a benefit, such as a certain amount of gaming credit for use at gaming machine 104, in exchange for using the gaming machine 104 for check-in or check-out. Such an offer may lead a player to use a gaming machine 104 for check-out instead of using in-room check-out. Consequently the player may engage in a visit to a gaming machine and in gaming activity at the gaming machine which would not otherwise have occurred.

Alternatively, the casino server 200 may offer the player a benefit for checking out of his or her room early. Another type of offer would provide a benefit to a player for delaying check-in, or delaying occupancy of the room.

As still another sort of offer, the casino server 200 may inquire of a player at a gaming device 300 whether the player is willing to relinquish his or her room entirely for the night. Such an inquiry may be made to a player who has already stayed up late (say until 3 a.m.) and who may wish to forego sleeping that night.

As another possible offer, the casino server 200 may inquire of the player whether the player is willing to move to another hotel (e.g., to a hotel under common ownership with the hotel served by the casino server 200).

The player may also be offered a benefit for waiving some or all of the customary cleaning services for the player's room.

In any or all of the above offers, the benefit to be provided to the player may include one or more gaming credits, cashless gaming receipts, cash payments, free goods or services (such as free meals, free room service, free room stays), discounts on room stays or other goods or services, discounts or free goods or services to be provided at subsequent visits to the casino hotel, players' club points and so forth. Other benefits that may be provided to players in conjunction with offers from the casino server 200 may relate to game play on a gaming device 300. Such benefits may include an increased payout for certain gaming outcomes (e.g., double payout for a royal flush on a video poker machine), or improved odds of favorable outcomes, or other advantages in game play.

One or more benefits may be provided to the player if the player answers a survey by using the gaming device 300 or the wireless terminal 400. Survey questions could include the player's planned length of stay, preferred entertainment (e.g., shopping, sports, shows), occupation, planned activities/interests, etc. The results of the survey could be used to select and/or tailor offers to be made to the player.

The gaming device 300 could be caused to operate such that certain game outcomes result in a free stay in a hotel room, a discount on the room rate, or a free room upgrade. For example, room upgrades may be provided as prizes for certain game outcomes when a relatively large number of more desirable rooms are not reserved or occupied on a given night.

Selection by the casino server 200 of particular players to receive offers, or determination of an order in which players are to receive offers, may be based upon a "rating" of the player which is intended to predict a likelihood that the player would accept the offer. The "rating" of the player may be determined by the casino server based on information regarding the player that is stored in the casino server, or may be inputted by casino employees based on observations of the player by the casino employees. For example, if a casino employee observes that a particular player is relatively young and appears interested in gambling all night, the casino employee may input a high rating for the player to receive an offer to relinquish his or her room for the night. Similarly, if the casino server 200 detects that a player has been continuously playing one of the gaming device 300 from 10 p.m. until 2 a.m., the player may be given a high rating by the casino server 200 for an offer that the player relinquish his or her room.

The server 102 may also offer benefits to players contingent on the player engaging in certain amounts of gaming activity on one or more gaming devices 104. For example, the player may be offered a free stay in a hotel room or a free room upgrade if the player plays for three hours on the gaming device 300, or if the player bets a certain amount over time on the gaming device 300. In connection with such an offer, an image (actual or simulated) of the offered room may be provided. Other types of benefits, such as free products or services, may be provided.

The player may also be permitted to apply gaming credits in the gaming device 300, including credits won, to payment of items on the player's hotel account, such as room charges, restaurant meal charges, room service, etc.

Another type of benefit that may be provided to a player in response to gaming activity, using the gaming device 300 for check-in or check-out or acceptance of an offer may be entries in sweepstakes for various benefits, including free room stays or room upgrades. Sweepstakes entries, and/or awards of prizes, may be awarded for playing at a gaming device 300 for a certain amount of time, or at a certain point in time, or for wagering a particular amount. Such incentives may lead players to increase their gaming activity at the gaming device 300.

The player may be permitted to use the gaming device 300 or the wireless terminal 400 for other purposes relating to his or her room, such as requesting delivery of the player's luggage to his or her room or removal of luggage from his or her room. The player may also be allowed to indicate via a gaming device 300 that his or her room is not to be entered by cleaning staff at certain times. Alternatively, the player might be permitted to register a complaint via input provided by the player through the gaming device 300.

Some hotels may require that a guest provide a deposit at check-in or during a hotel stay for a room and/or for products or services associated with the room. In some embodiments, a player may use a gaming device 300 to provide a deposit for a room and/or for the use of hotel amenities (e.g., a telephone, an in-room entertainment system, a room safe, a video cassette recorder, or a game console). A player may be prompted to insert an amount of funds (e.g., cash, or gaming tokens) at the game device to cover a deposit, or to approve the billing of a deposit amount to a financial account (e.g., credit card account) associated with the player. In some embodiments, the player may be permitted to satisfy an obligation in lieu of providing a deposit amount. For example, in an offer to a player to waive or otherwise satisfy a deposit, a hotel may require that a player play at a gaming device 300 for a predetermined amount of time, or that the player wager a predetermined amount at a gaming device 300. A deposit may be credited to a player's bill at check-out or at any time. Also, a deposit amount may be returned/refunded to the player at a gaming device 300 during check-out or at any time.

A player may also be permitted to use a gaming device 300 to make reservations for future stays at the casino hotel. The player may be accorded benefits for making such a reservation, such as gaming credit that may be made available immediately on the gaming device 300, or that may be made available upon the future visit to the casino hotel. The player may also be permitted to cancel a reservation at a competing casino hotel, and may be provided with one or more benefits for so doing. An offer made to a player to switch from a competing hotel may be based on the room rate at the competing hotel. For example, one or more terms of the offer, and/or whether or not the offer is made, may be based on the room rate. The offer may include assistance in moving from the competing hotel, including retrieving the player's luggage from the competing hotel, and/or providing transportation for the player's family. The player may also be permitted to request services such as exchange of foreign currency into U.S. dollars via the gaming device 300.

The foregoing description discloses only exemplary embodiments of the invention; modifications of the above disclosed apparatus and methods which fall within the scope of the invention will be readily apparent to those of ordinary skill in the art. While the above embodiments have been described with respect to a gaming device, it should be understood that alternatively a player could manage hotel transactions from table games such as blackjack, craps or roulette. In such cases, a player may interface his or her player tracking card to a player tracking card reader at the table game, or the dealer may interface the player tracking card to the player tracking card reader. A display device at the table could show the player his or her reservation information and allow the player to make changes. Benefits could be provided by the dealer in the form of gaming tokens.

All of the gaming devices 104 and the wireless terminal 108 of the system may be located in or adjacent to the hotel casino served by the server 102. Alternatively, one or more of the gaming device 104 and/or the wireless terminal 108 may be located remotely from the casino hotel, e.g., at an airport for the city in which the casino hotel is located. In such a case, a player may be permitted to check in to the hotel by using a gaming device 104 upon arriving at the airport.

Accordingly, while the present invention has been disclosed in connection with exemplary embodiments thereof, it should be understood that other embodiments may fall within the spirit and scope of the invention as defined by the following claims.

What is claimed is:

1. A method comprising:
   receiving a player identifier at a gaming device, the player identifier being associated with a player;
   accessing a schedule associated with the player identifier;
   retrieving information related to at least one scheduled non-gaming event on said schedule; and
   without receiving a request from the player, automatically providing the player an offer associated with a period of time on said schedule for which no event is scheduled.

2. The method of claim 1 wherein said at least one scheduled non-gaming event comprises a dining event.

3. The method of claim 1 further comprising communicating to the player at least one of a recommendation and an offer related to the at least one scheduled non-gaming event.

4. The method of claim 3 further comprising retrieving, from a database, information related to at least one of: (a) a restaurant, and (b) one of one or more offers.

5. The method of claim 1 further comprising receiving information related to the at least one scheduled non-gaming event via the gaming device.

6. The method of claim 5 wherein the received information comprises a request from the player.

7. The method of claim 6 wherein the request comprises a request for at least one of a suggestion for a dining locale, a number of people in a party including the player, and an estimated amount to be spent.

8. The method of claim 6 wherein the request comprises a request for a suggestion of an activity to take place during a period of time when the at least one scheduled non-gaming event is not scheduled to take place.

9. The method of claim 1 which includes automatically communicating, without assistance of a person, a reminder of the at least one scheduled non-gaming event to the player at the gaming device.

10. An apparatus comprising:
    at least one processor;
    at least one input device; and
    at least one memory device storing a plurality of instructions which, when executed by the at least one processor, cause the at least one processor to operate with the at least one input device to:
    receive a player identifier at a gaming device, the player identifier being associated with a player;
    access a schedule associated with the player identifier;
    retrieve information related to at least one scheduled non-gaming event on said schedule; and
    without receiving a request from the player, automatically provide the player an offer associated with a period of time on said schedule for which no event is scheduled.

11. A non-transitory computer readable medium storing a plurality of instructions which, when executed by a processor, cause the processor to:
    receive a player identifier at a gaming device, the player identifier being associated with a player;
    access a schedule associated with the player identifier;
    retrieve information related to at least one scheduled non-gaming event on said schedule; and
    without receiving a request from the player, automatically provide the player an offer associated with a period of time on said schedule for which no event is scheduled.

12. The method of claim 9 wherein automatically communicating the reminder of the at least one scheduled non-gaming event to the player at the gaming device includes causing a printer of the gaming device to print the reminder of the at least one scheduled non-gaming event.

13. The method of claim 9 wherein automatically communicating the reminder of the at least one scheduled non-gaming event to the player at the gaming device includes automatically communicating the reminder of the at least one scheduled non-gaming event via a telephone distinct from the gaming device.

14. The apparatus of claim 10 wherein the plurality of instructions, when executed by the at least one processor, cause the at least one processor to automatically communicate, without assistance of a person, a reminder of the at least one scheduled non-gaming event to the player at the gaming device.

15. The non-transitory computer readable medium of claim 11 wherein the plurality of instructions, when executed by the at least one processor, cause the at least one processor to automatically communicate, without assistance of a person, a reminder of the at least one scheduled non-gaming event to the player at the gaming device.

* * * * *

UNITED STATES PATENT AND TRADEMARK OFFICE
CERTIFICATE OF CORRECTION

PATENT NO. : 8,480,486 B2  
APPLICATION NO. : 12/237123  
DATED : July 9, 2013  
INVENTOR(S) : Scott T. Friesen et al.

Page 1 of 1

It is certified that error appears in the above-identified patent and that said Letters Patent is hereby corrected as shown below:

IN THE CLAIMS

In Claim 15, Column 26, Line 49, delete both instances of "at least one".

Signed and Sealed this
Second Day of December, 2014

Michelle K. Lee
*Deputy Director of the United States Patent and Trademark Office*